(12) United States Patent
Morita et al.

(10) Patent No.: US 8,322,767 B2
(45) Date of Patent: Dec. 4, 2012

(54) PICK-UP STYLE UTILITY VEHICLE WITH EXPANDABLE CARGO BED

(75) Inventors: Hirokazu Morita, Kakogawa (JP);
Shigeru Yamashita, Akashi (JP); Takao Kawabata, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 176 days.

(21) Appl. No.: 12/849,285

(22) Filed: Aug. 3, 2010

(65) Prior Publication Data
US 2012/0032465 A1  Feb. 9, 2012

(51) Int. Cl.
*B62D 33/02* (2006.01)
(52) U.S. Cl. ............... 296/24.33; 296/24.43; 296/65.09; 296/183.1
(58) Field of Classification Search ............... 296/165, 296/171, 175, 24.3, 24.33, 24.4, 24.43, 26.08, 296/62.09, 26.1, 26.11, 183.11, 183.2, 190.03, 296/191, 37.6, 64, 65.01, 66, 65.09, 183.1; 280/756, 749
See application file for complete search history.

(56) References Cited

U.S. PATENT DOCUMENTS

| | | | | |
|---|---|---|---|---|
| 3,336,074 A | * | 8/1967 | Barnes et al. | 296/102 |
| 3,933,371 A | * | 1/1976 | Graham | 280/756 |
| 6,517,135 B2 | * | 2/2003 | de Gaillard | 296/26.09 |
| 6,905,159 B1 | | 6/2005 | Saito et al. | |
| 6,994,388 B2 | | 2/2006 | Saito et al. | |
| 7,249,798 B2 | * | 7/2007 | Saito et al. | 296/205 |
| 2011/0156427 A1 | * | 6/2011 | Morita et al. | 296/26.08 |

* cited by examiner

*Primary Examiner* — Jason S Morrow
(74) *Attorney, Agent, or Firm* — Wenderoth, Lind & Ponack, LLP

(57) ABSTRACT

A pick-up style utility vehicle includes a front seat, a rear seat, a screen shield, a cargo bed, and a cabin frame housing at least the front seat and the rear seat and forming a riding space. The cargo bed is state changeable between the expanded state in which the cargo bed expands forward and the unexpanded state not occupying the riding space. The cabin frame includes a pair of left and right front side frame bodies, a pair of left and right rear side frame bodies, and cross frame members coupling the front and rear side frame bodies. The front side frame bodies are fixed to the vehicle body and the rear side frame bodies and the cross frame members are changeable with respect to the vehicle body according to the state change of the cargo bed.

2 Claims, 19 Drawing Sheets

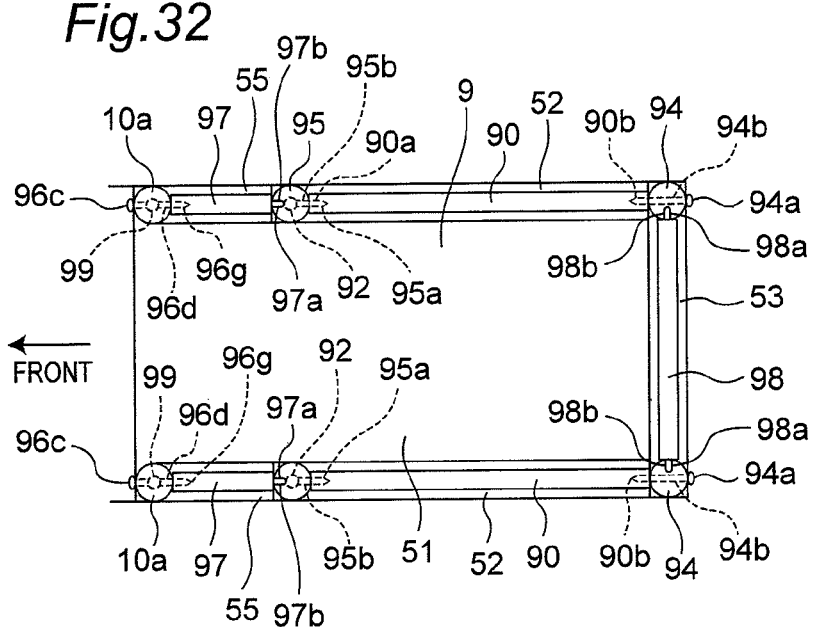
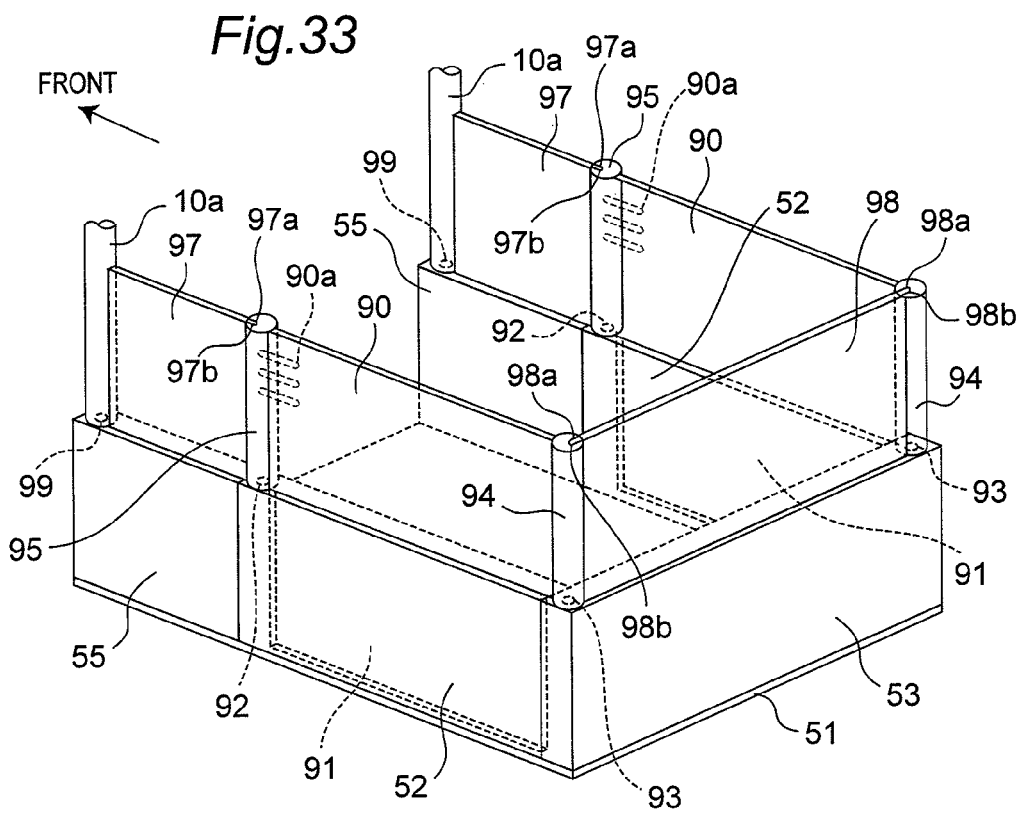

PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed forward so as to optimize the area or capacity of a cargo bed space and a passenger space according to the needs of users.

2. Description of the Prior Art

At present, utility vehicles of various styles are used. In addition to pick-up style utility vehicles with a relatively large cargo bed behind a seat, there are straddle-type all terrain vehicles having a handle bar, or the like.

Typically, the pick-up style utility vehicles are more practical than the handle bar type utility vehicles belonging to the straddle-type all terrain vehicles. The pick-up style utility vehicles are used for hunting in fields and mountains, conveyance of lumber, movement in golf courses, golf course maintenance, and other applications.

The present applicant has formerly applied the inventions relating to the pick-up style utility vehicle with a cargo bed whose area or capacity can be expanded. Their applications have been filed. For instance, there are U.S. Pat. Nos. 6,905,159, 6,994,388, and 7,249,798.

The configuration of the pick-up style utility vehicle disclosed in the respective documents includes a front seat including a driver's seat, a rear seat, and a cargo bed in this order from front. The rear seat is changed between the used state and the retracted state so as to be switched between 2 passengers transformation and 4 passengers transformation. Therefore, in 2 passengers transformation, the front portion of the cargo bed is expandable to a riding space occupied by the rear seat in the used state.

In addition, a screen shield is typically provided at the front end of the cargo bed of the pick-up style utility vehicle so as not to move loads loaded in the cargo bed into the riding space in front of the cargo bed. The position of the screen shield is required to be changed between 2 passengers transformation expanding the cargo bed forward (the expanded form of the cargo bed) and 4 passengers transformation not expanding the cargo bed (the unexpanded used form).

A cabin frame surrounding a cabin of the pick-up style utility vehicle integrally includes, for example, a pair of left and right front side frame bodies, a pair of left and right rear side frame bodies, and cross frame members coupling the front and rear side frame bodies. In 2 passengers transformation expanding the cargo bed forward (the expanded form of the cargo bed), the existence of the rear side frame bodies obstructs load loading and unloading, and this leads to a problem that it is difficult to widely use the cargo bed.

SUMMARY OF THE INVENTION

The present invention has been made in view of the above problems and an object of the present invention is to simply and easily perform a load loading/unloading operation in 2 passengers transformation (the expanded form of a cargo bed).

Another object of the present invention is to provide a form for effectively utilizing a buckle of a seatbelt protection device of a rear seat in some form in 2 passengers transformation (the expanded form of the cargo bed).

Still another object of the present invention is to provide a form for preventing the occurrence of malfunction in a mechanism member such as a retractor and the buckle of the seatbelt protection device.

Yet another object of the present invention is to provide a form for easily forming an expandable side panel preventing the dropping of loads from the side of the cargo bed in 2 passengers transformation (the expanded form of the cargo bed).

Yet another object of the present invention is to provide a form, when the amount of loads to be loaded is increased, for easily increasing the height of the panel surface of the cargo bed for preventing the dropping of the loads.

To achieve the above object, the present invention provides a pick-up style utility vehicle including:
  a front seat;
  a rear seat;
  a screen shield; and
  a cargo bed on a vehicle body in this order from front; and
  a cabin frame housing at least the front seat and the rear seat and forming a riding space; wherein
  the cargo bed is state changeable between the expanded state in which the cargo bed expands forward so as to occupy a portion of the riding space provided by moving the rear seat forward and the unexpanded state not occupying the riding space,
  the cabin frame includes a pair of left and right front side frame bodies, a pair of left and right rear side frame bodies, and cross frame members coupling the front and rear side frame bodies, and
  the front side frame bodies are fixed to the vehicle body and the rear side frame bodies and the cross frame members are changeable with respect to the vehicle body according to the state change of the cargo bed.

The form of the prior art cabin frame integrally including the front side frame bodies, the rear side frame bodies, and the cross frame members is uniquely determined. On the other hand, the configuration according to the present invention is a separated configuration in which the rear side frame bodies and the cross frame members are separated from the front side frame bodies. Therefore, the degree of freedom of the form of the cabin frame is high so that a desired form can be made according to the application change of the cargo bed.

According to the present invention, preferably, the change of the rear side frame body and the cross frame member to the expanded state is performed by removing the rear side frame body and the cross frame member from the vehicle body.

With the above configuration, the rear side frame body and the cross frame member regulating load loading/unloading are eliminated. Thus, the operating space is significantly enlarged, so that load loading/unloading becomes easy. In addition, the weight of the vehicle can be reduced.

According to the present invention, preferably, the change of the rear side frame body and the cross frame member to the expanded state is performed by slidably moving the rear side frame body and the cross frame member forward on the vehicle body.

With the above configuration, the rear side frame body and the cross frame member regulating load loading/unloading are slidably moved forward. Thus, the operating space is enlarged, so that load loading/unloading becomes easy.

According to the present invention, preferably, the change of the rear side frame body and the cross frame member to the expanded state is performed by pivoting the rear side frame body and the cross frame member on the vehicle body and the front side frame body, respectively, pivotably mounting the cross frame member so as to be rotatable about a first crossing element and a second crossing element, pivoting the first crossing element and the second crossing element of the cross frame member on the rear side frame body, and tiltably moving the rear side frame body and the cross frame member forward.

With the above configuration, the rear side frame body and the cross frame member regulating load loading/unloading are tiltably moved forward. Thus, the operating space is enlarged, so that load loading/unloading becomes easy.

BRIEF DESCRIPTION OF THE DRAWINGS

FIG. 32 is a plan view of a cargo bed of a pick-up style utility vehicle according to a thirteenth embodiment of the present invention in an unexpanded state; and FIG. 33 is a perspective view of the cargo bed of the pick-up style utility vehicle of FIG. 32 in the unexpanded state from the rear left side.

DETAILED DESCRIPTION OF THE PREFERRED EMBODIMENTS

The basic form of a pick-up style utility vehicle according to the present invention will now be described in detail with reference to FIGS. 1 to 3.

Figure 1:
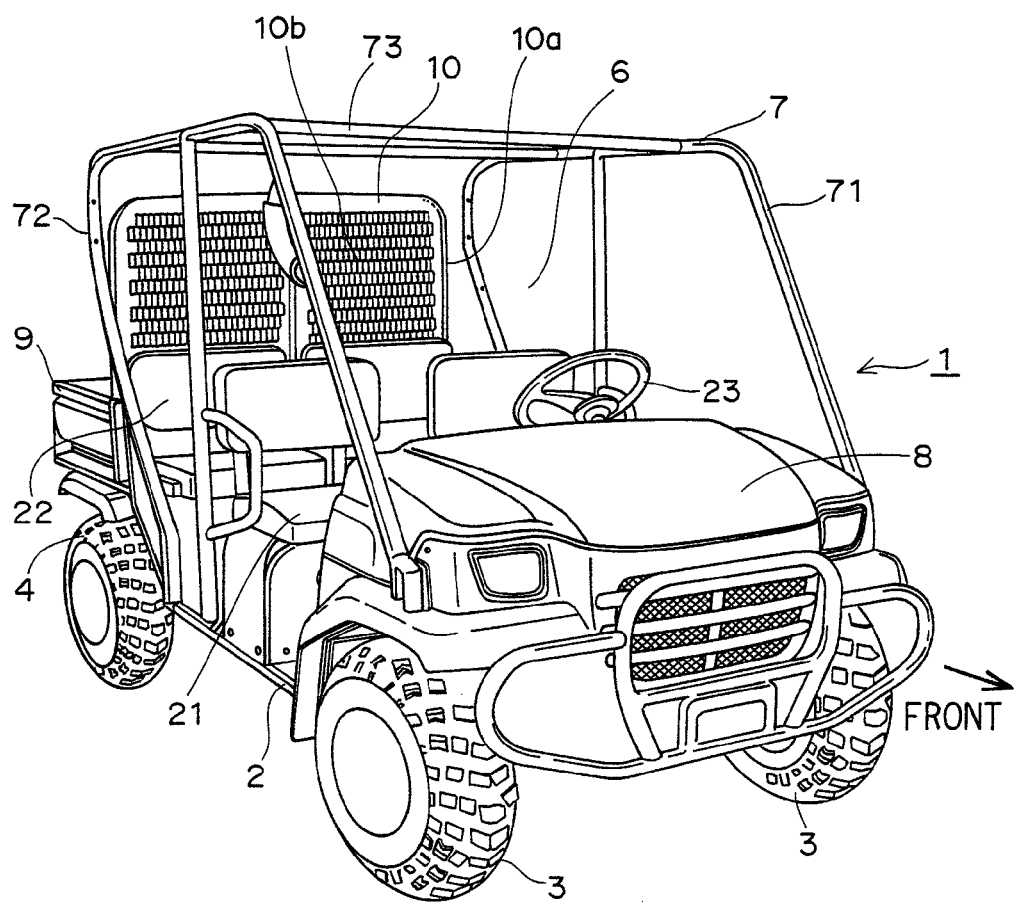
FIG. 1 is an overall perspective view of a pick-up style utility vehicle according to the present invention.

FIG. 1 is a perspective view of a pick-up style utility vehicle 1 with an expandable cargo bed 9. The pick-up style utility vehicle 1 has a vehicle body 2 supported by a pair of left and right front wheels 3 and a pair of left and right rear wheels 4. A cabin frame 7 configuring a cabin (riding space) 6 is provided in an intermediate portion on the vehicle body 2 in a front-rear direction. A hood 8 is provided in front of the cabin frame 7. The cargo bed 9 is provided behind the cabin frame 7. A screen shield 10 partitioning the cargo bed 9 and the cabin 6 is provided at the front end of the cargo bed 9 so as to be position changeable forward and rearward.

The cabin frame 7 surrounding the cabin 6 has a pair of left and right front side frame bodies 71 configuring the front portion of the cabin 6 and including metal pipes, a pair of left and right rear side frame bodies 72 configuring the rear portion of the cabin 6 and including metal pipes, and a plurality of cross frame members 73 including metal pipes coupling the front side frame bodies 71 and the rear side frame bodies 72. The front side frame bodies 71 are fixed to the vehicle body 2. Except for the later-described first to third embodiments, the rear side frame bodies 72 are also fixed to the vehicle body 2.

A bench-shaped front seat 21 is installed in the front portion of the cabin 6. A foldable bench-shaped rear seat 22 is installed in the rear portion of the cabin 6. A steering wheel 23 and a dashboard (operating portion) 24 are provided at the front end of the cabin 6.

Figure 2:
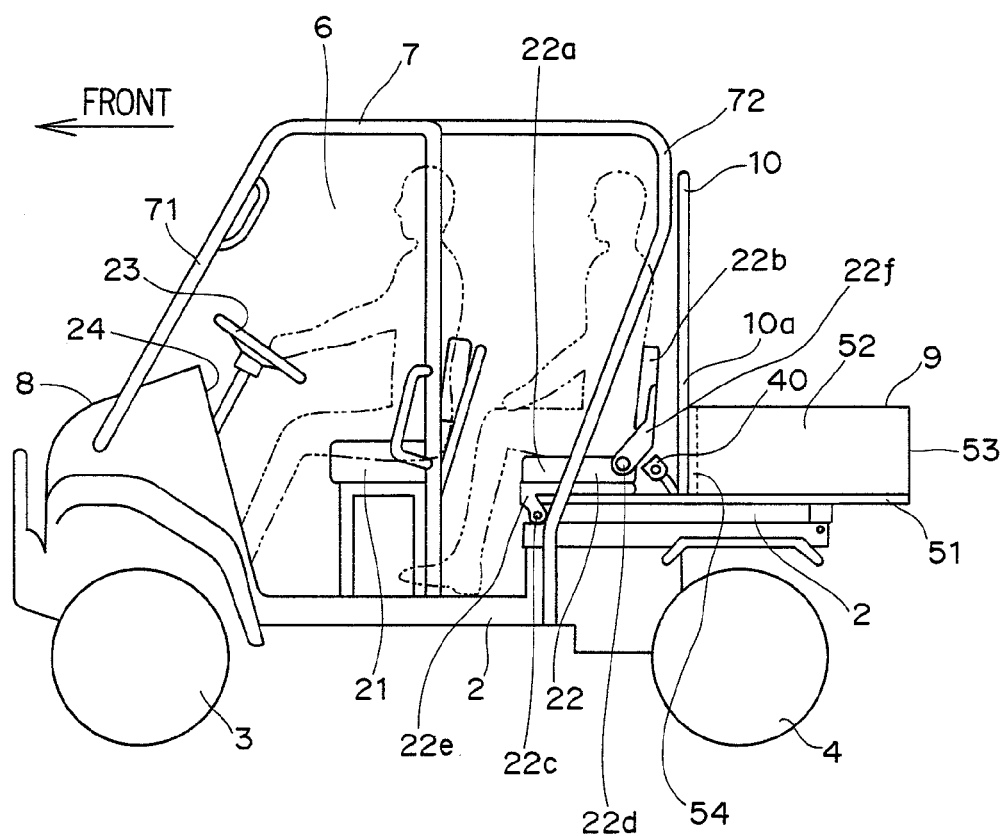
FIG. 2 is a left side view of the pick-up style utility vehicle of FIG. 1 when a cargo bed is in an unexpanded state.
Figure 3:
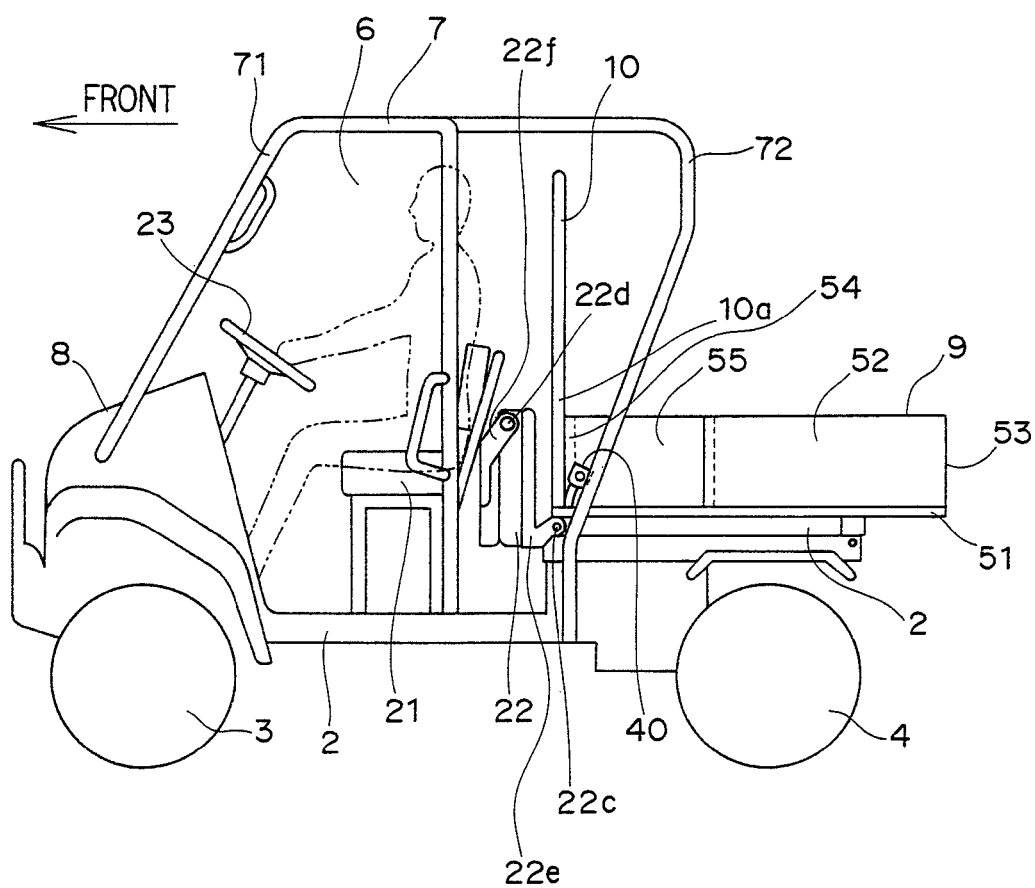
FIG. 3 is a left side view of the pick-up style utility vehicle of FIG. 1 when the cargo bed is in an expanded state.

The pick-up style utility vehicle with the expandable cargo bed 9 is changeable between 4 passengers transformation (unexpanded used state) contracting the cargo bed 9 as shown in FIG. 2 and 2 passengers transformation (expanded used state) folding the rear seat 22 and expanding the cargo bed 9 forward as shown in FIG. 3. The configuration of the pick-up style utility vehicle changeable between the unexpanded used state and the expanded used state will be described below in detail with reference to the drawings.

FIG. 2 is a left side view of the pick-up style utility vehicle in 4 passengers transformation. The front seat 21 fixedly installed in the front portion of the cabin 6 has a seat leg erected on the floor surface of the cabin 6, a seat bottom provided on the upper end face of the seat leg, and a backrest. The front seat 21 typically extends leftward and rightward to near the left and right ends of the cabin 6. With this configuration, two persons can be seated side by side. The driver can be seated on one (e.g., left) seating area and the passenger can be seated on the other seating area. The rear seat 22 arranged in the rear portion of the cabin 6 has a seating portion 22a arranged on the upper side of an engine box housing an engine (not shown), and a backrest 22b. As well as the front seat 21, the seating portion 22a and the backrest 22b of the rear seat 22 extend leftward and rightward to near the left and right ends of the cabin 6. With this configuration, two passengers can be seated side by side.

The folded configuration of the rear seat 22 will be described in detail. As shown in FIG. 2, the seating portion 22a is fixed to the upper surface of a supporting base 22e. The front end of the supporting base 22e is rotatably supported at the front upper end of the engine box via a hinge 22c. A pair of left and right stays 22f extending downward are fixed to the backrest 22b. The lower end of each of the stays 22f is rotatably coupled to the rear end of the seating portion 22a via a hinge 22d.

FIG. 3 shows the state of folding the rear seat 22. The backrest 22b is rotated about the hinge 22d so as to be contacted with the upper surface of the seating portion 22a. The seating portion 22a is then rotated about the hinge 22c so as to be in the substantially vertical state together with the backrest 22b so that the rear seat 22 is folded into the retracted state of FIG. 3. As described above, the rear seat 22 is folded and retracted so that the rear portion of the cabin 6 can be used as the forward expanded space of the cargo bed 9.

The configuration of the expandable cargo bed 9 will be described. As shown in FIG. 1, the screen shield 10 has a frame 10a including a metal pipe formed in a U-shape, and a resin or metal net 10b provided to the frame 10a. As shown in FIGS. 2 and 3, the cargo bed 9 basically has a stationary bottom plate 51 attached onto the rear portion of the vehicle body 2, a pair of stationary side panels 52 provided substantially perpendicularly with respect to the stationary bottom plate 51 along the left and right ends of the stationary bottom plate 51, a stationary rear panel 53 provided at the rear end of the stationary bottom plate 51, a front panel 54 position adjustable forward and rearward, and a pair of left and right expandable side panels 55 for expanding the cargo bed 9 forward.

First Embodiment

A pick-up style utility vehicle 1 according to a first embodiment of the present invention will be described with reference to FIGS. 4 and 5.

Figure 4:
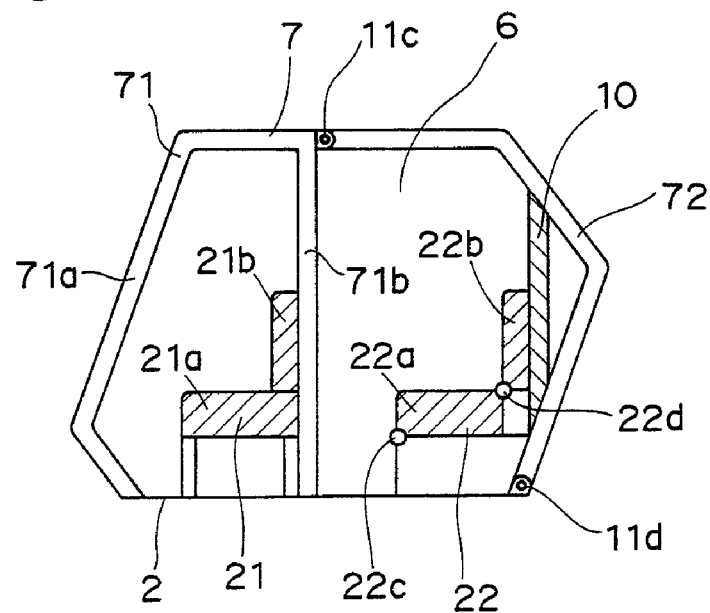
FIG. 4 is a schematic left side view of a cabin frame surrounding a cabin of a pick-up style utility vehicle according to a first embodiment of the present invention when a cargo bed is in an unexpanded state.

FIG. 4 is a schematic left side view of a cabin frame 7 surrounding a cabin 6 of the pick-up style utility vehicle 1 according to the first embodiment of the present invention when a cargo bed 9 is in an unexpanded state. FIG. 5 is a schematic left side view of the cabin frame 7 of the pick-up style utility vehicle 1 of FIG. 4 when the cargo bed 9 is in an expanded state.

In the first embodiment of the present invention, a rear side frame body 72 is detachable from a front side frame body 71 fixed to the front portion of a vehicle body 2.

Specifically, in the unexpanded state of the cargo bed 9 shown in FIG. 4, the rear side frame body 72 is fixed to the front side frame body 71 via a front coupling portion 11c and is fixed to the rear portion of the vehicle body 2 via a rear coupling portion 11d. The front coupling portion 11c has a coupling configuration formed by inserting a front pin into between a pin insertion hole in the upper portion at the rear end of the front side frame body 71 and a pin insertion hole in the upper portion at the front end of the rear side frame body 72. Likewise, the rear coupling portion 11d has a coupling configuration formed by inserting a rear pin into between a pin insertion hole in the lower portion at the rear end of the rear side frame body 72 and a pin insertion hole in the upper portion on the rear side of the vehicle body 2. Herein, the rear seat 22 is arranged on the upper side of the engine box housing the engine in the rear portion of the cabin 6 protected by the rear side frame body 72.

Figure 5:
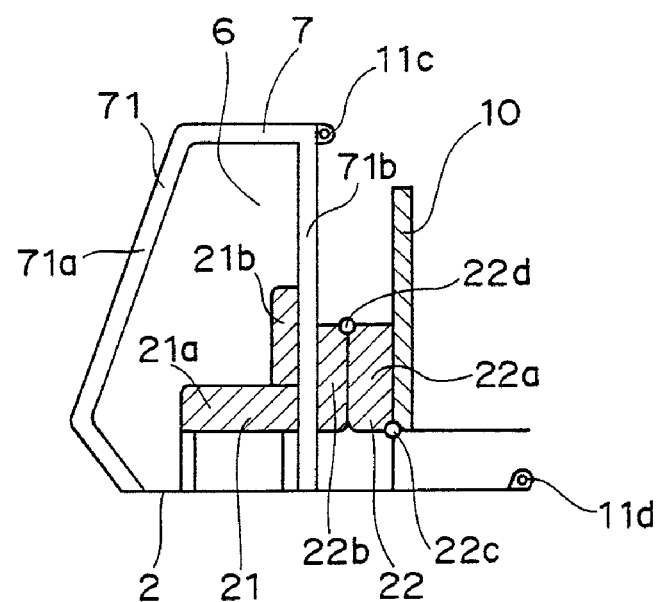
FIG. 5 is a schematic left side view of the cabin frame of the pick-up style utility vehicle of FIG. 4 when the cargo bed is in an expanded state.

In the expanded state of the cargo bed 9 shown in FIG. 5, the rear side frame body 72 is detached from the front side frame body 71 and the rear portion of the vehicle body 2. In other words, the front pin and the rear pin inserted into the pin insertion holes are pulled out so that the rear side frame body 72 can be easily detached from the front side frame body 71 and the vehicle body 2. The backrest 22b is rotated about the hinge 22d so as to be contacted with the upper surface of the seating portion 22a. The seating portion 22a is then rotated about the hinge 22c so as to be in the substantially vertical state together with the backrest 22b so that the rear seat 22 is folded into the retracted state of FIG. 3.

According to the first embodiment, the rear seat 22 is folded and retracted to detach the rear side frame body 72 so that the rear portion of the cabin 6 can be utilized as the forward expanded space of the cargo bed 9.

Second Embodiment

A pick-up style utility vehicle 1 according to a second embodiment of the present invention will be described with reference to FIGS. 6 and 7.

Figure 6:
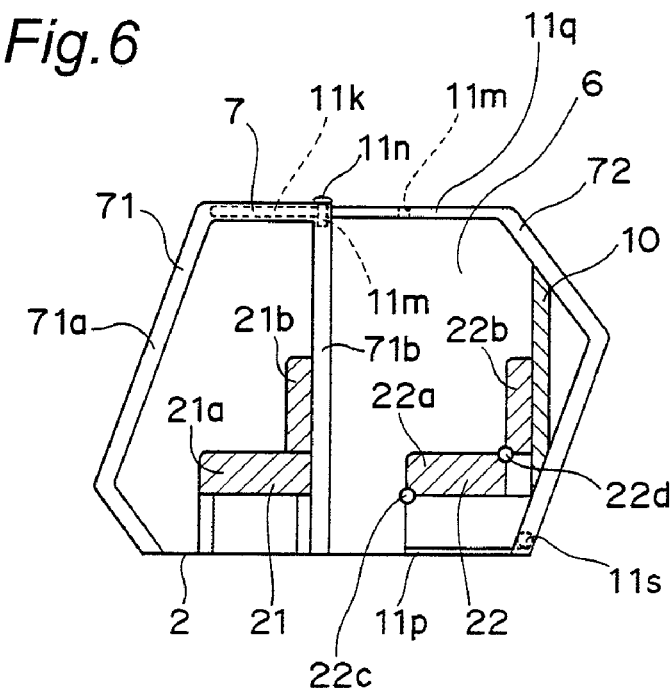
FIG. 6 is a schematic left side view of a cabin frame surrounding a cabin of a pick-up style utility vehicle according to a second embodiment of the present invention when a cargo bed is in an unexpanded state.

FIG. 6 is a schematic left side view of a cabin frame 7 surrounding a cabin 6 of the pick-up style utility vehicle 1 according to the second embodiment of the present invention when a cargo bed 9 is in an unexpanded state. FIG. 7 is a schematic left side view of the cabin frame 7 of the pick-up style utility vehicle 1 of FIG. 6 when the cargo bed 9 is in an expanded state.

In the second embodiment of the present invention, a rear side frame body 72 is slidably movable with respect to a front side frame body 71 fixed to the front portion of a vehicle body 2.

Specifically, a small-diameter rod portion 11q forming the upper portion on the front side of the rear side frame body 72 and extending forward and rearward is inserted into a large-diameter hole 11k provided in the upper portion on the rear side of the front side frame body 71 and extending forward and rearward. A wheel 11s provided in the lower portion at the rear end of the rear side frame body 72 is slidably moved on a guide rail 11p provided in the rear portion of the vehicle body 2. Accordingly, the rear side frame body 72 is slidably movable forward and rearward with respect to the front side frame body 71 and the vehicle body 2. The small-diameter rod portion 11q has a plurality of positioning holes 11m opened in the up-down direction. A positioning pin 11n is inserted into the insertion hole in the top portion of a rear pillar portion 71b of the front side frame body 71 and is then passed through the front positioning hole 11m of the rear side frame body 72 so that the rear side frame body 72 is positioned in the unexpanded position.

Figure 7:
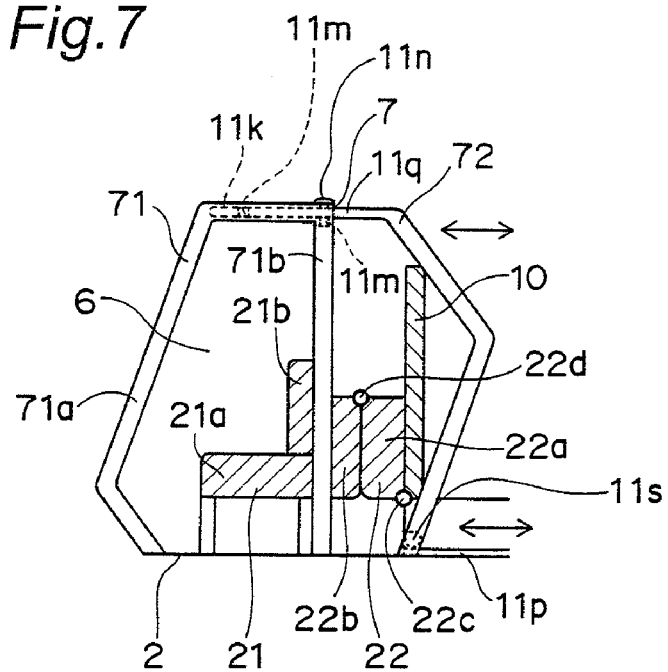
FIG. 7 is a schematic left side view of the cabin frame of the pick-up style utility vehicle of FIG. 6 when the cargo bed is in an expanded state.

In the expanded state of the cargo bed 9 shown in FIG. 7, the rear side frame body 72 is slidably moved forward with respect to the front side frame body 71 and the vehicle body 2. The positioning pin 11n passed through the insertion hole of the rear pillar portion 71b of the front side frame body 71 is pulled out to lightly press the rear side frame body 72 forward so that the rear side frame body 72 is slidably moved forward. The positioning pin 11n is inserted into the insertion hole in the top portion of the rear pillar portion 71b of the front side frame body 71 and is then passed through the rear positioning hole 11m of the rear side frame body 72 so that the rear side frame body 72 is positioned in the expanded position. The backrest 22b is rotated about the hinge 22d so as to be contacted with the upper surface of the seating portion 22a. The seating portion 22a is then rotated about the hinge 22c so as to be in the substantially vertical state together with the backrest 22b so that the rear seat 22 is folded into the retracted state of FIG. 3.

According to the second embodiment, the rear seat 22 is folded and retracted to slidably move the rear side frame body 72 forward so that the rear portion of the cabin 6 can be utilized as the forward expanded space of the cargo bed 9.

Third Embodiment

A pick-up style utility vehicle 1 according to a third embodiment of the present invention will be described with reference to FIGS. 8 and 9.

Figure 8:
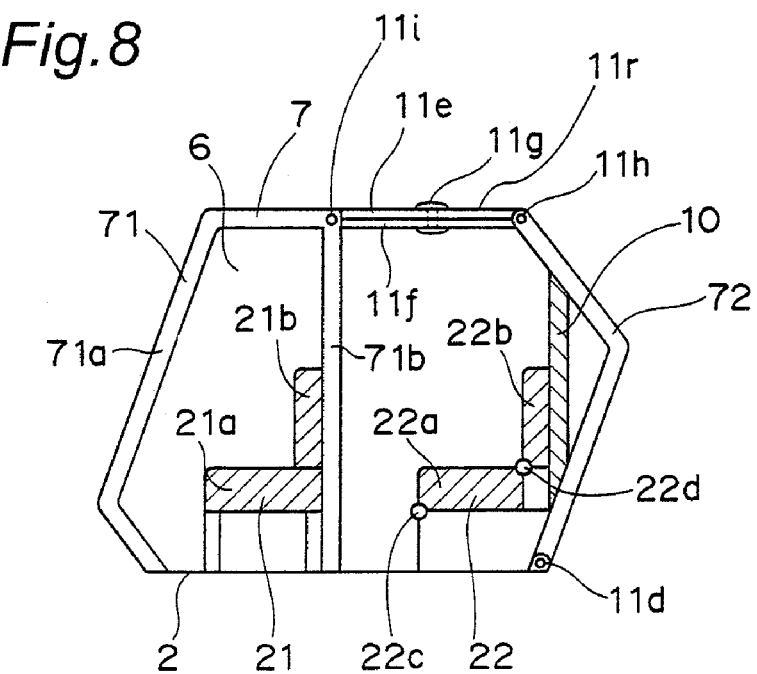
FIG. 8 is a schematic left side view of a cabin frame surrounding a cabin of a pick-up style utility vehicle according to a third embodiment of the present invention when a cargo bed is in an unexpanded state.

FIG. 8 is a schematic left side view of a cabin frame 7 surrounding a cabin 6 of the pick-up style utility vehicle 1 according to the third embodiment of the present invention when a cargo bed 9 is in an unexpanded state. FIG. 9 is a schematic left side view of the cabin frame 7 of the pick-up style utility vehicle 1 of FIG. 8 when the cargo bed 9 is in an expanded state.

In the third embodiment of the present invention, a rear side frame body 72 is tiltably movable forward with respect to a vehicle body 2.

As well shown in FIG. 8, the rear side frame body 72 is coupled to a front side frame body 71 by a pivoting coupling mechanism 11r, and a plurality of coupling portions 11i, 11h, and 11d. The pivoting coupling mechanism 11r has a scissors shape in which an upper bar member 11e as a first crossing element and a lower bar member 11f as a second crossing element are pivoted in the crossed state by a pin 11g. The front end of the pivoting coupling mechanism 11r on each of the left and right sides is coupled to the upper end of a rear pillar portion 71b of the front side frame body 71 on each of the left and right sides via the coupling portion 11i. The rear end of the pivoting coupling mechanism 11r on each of the left and right sides is coupled to the front end of the rear side frame body 72 on each of the left and right sides via the coupling portion 11h. The rear end of the rear side frame body 72 on each of the left and right sides is coupled to the rear portion of the vehicle body 2 via the coupling portion 11d. In the unexpanded state of the cargo bed 9 shown in FIG. 8, the angle formed between the upper bar member 11e and the lower bar member 11f of the pivoting coupling mechanism 11r is small, the interval between the coupling portions 11i and 11h in the front-rear direction is increased, and the pivoting coupling mechanism 11r is in the extended state. Accordingly, the rear side frame body 72 is positioned in the unexpanded position.

Figure 9:
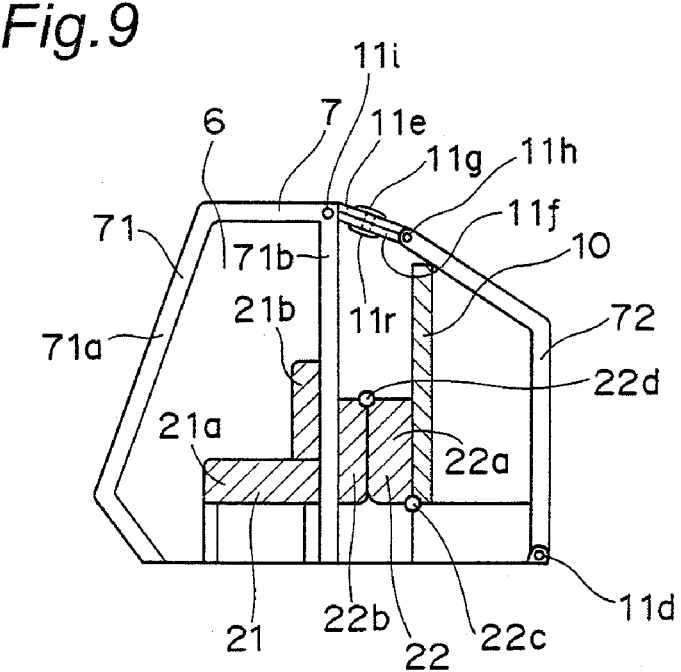
FIG. 9 is a schematic left side view of the cabin frame of the pick-up style utility vehicle of FIG. 8 when the cargo bed is in an expanded state.

As in the expanded state of the cargo bed 9 shown in FIG. 9, the pivoting coupling mechanism 11r is in the pressed contracted state. In other words, the angle formed between the upper bar member 11e and the lower bar member 11f of the pivoting coupling mechanism 11r is large and the interval between the coupling portions 11i and 11h in the front-rear direction is small. In this case, as compared with the unexpanded state of the cargo bed 9 shown in FIG. 8, the angle of the rear side frame body 72 formed with respect to the vehicle body 2 is smaller so that the rear side frame body 72 is shifted by being tilted forward. The backrest 22b is rotated about the hinge 22d so as to be contacted with the upper surface of the seating portion 22a. The seating portion 22a is then rotated about the hinge 22c so as to be in the substantially vertical state together with the backrest 22b so that the rear seat 22 is folded into the retracted state of FIG. 3.

According to the third embodiment, the rear seat 22 is folded and retracted to tiltably move the rear side frame body 72 forward so that the rear portion of the cabin 6 can be utilized as the forward expanded space of the cargo bed 9.

Fourth Embodiment

Figure 10:
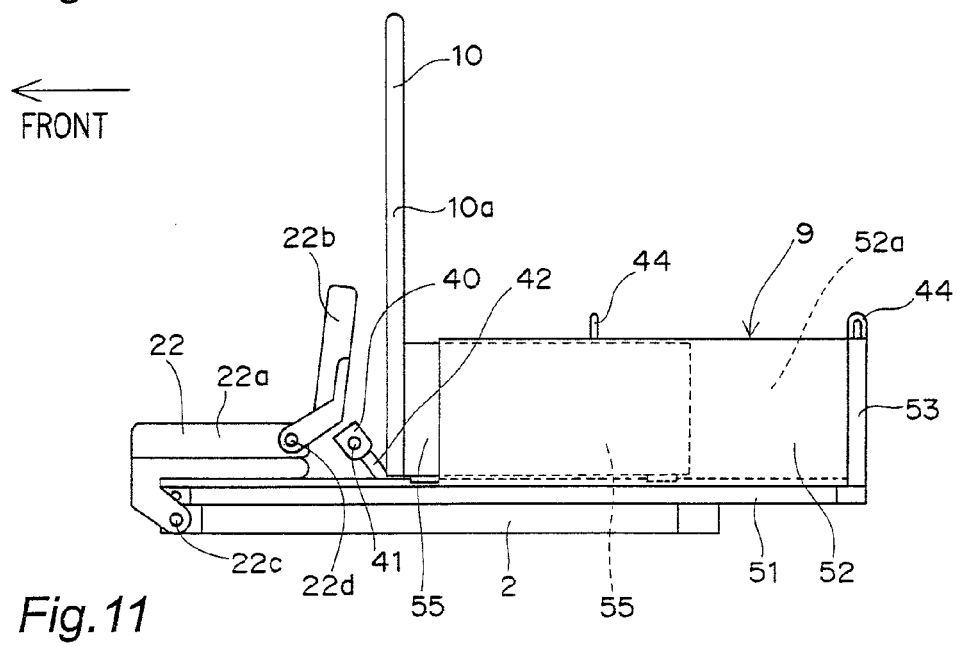
FIG. 10 is a left side view of a cargo bed of a pick-up style utility vehicle according to a fourth embodiment of the present invention in an unexpanded state.
Figure 11:
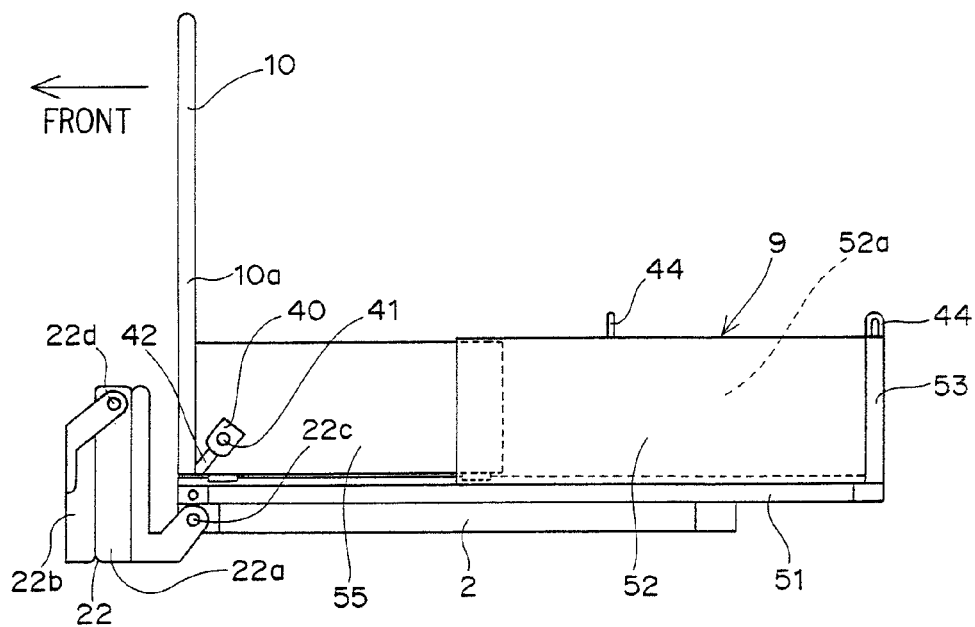
FIG. 11 is a left side view of the cargo bed of the pick-up style utility vehicle of FIG. 10 in an expanded state.
Figure 12:
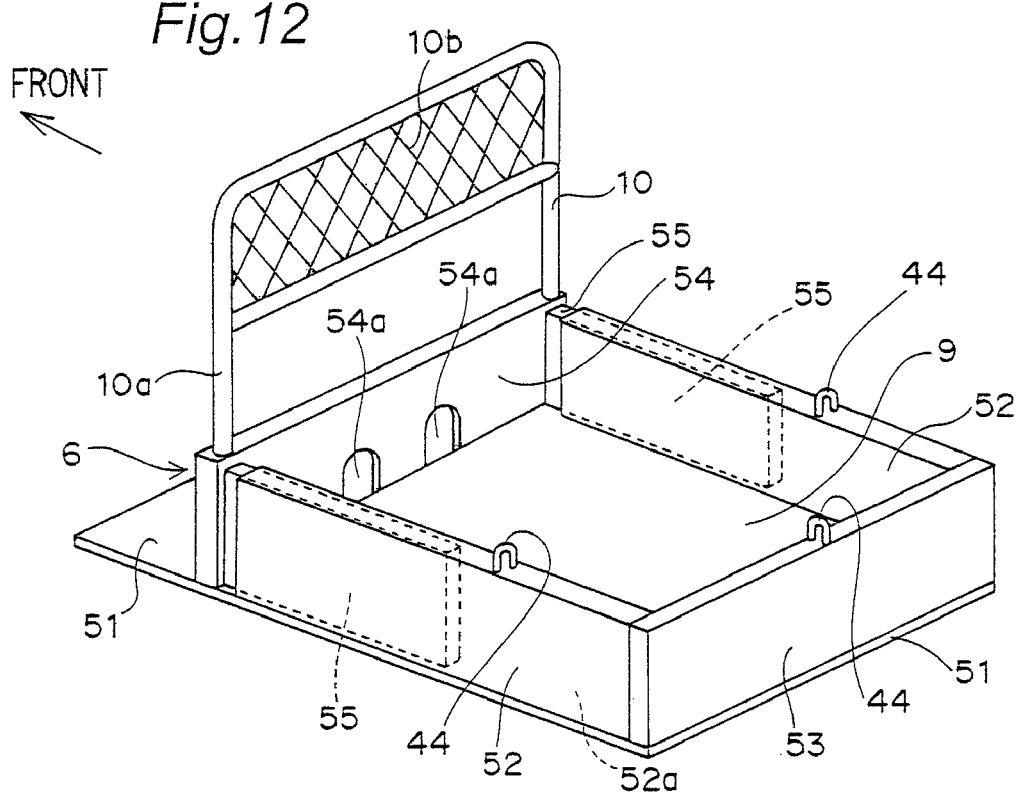
FIG. 12 is a perspective view of the cargo bed in the unexpanded state of FIG. 10 seen from the left rear side.

FIGS. 10 to 14 show a fourth embodiment of the present invention. FIG. 10 is a left side view of a cargo bed 9 of a pick-up style utility vehicle 1 in an unexpanded state. FIG. 11 is a left side view of the cargo bed 9 shown in FIG. 10 in an expanded state. FIG. 12 is a perspective view of the cargo bed 9 in the unexpanded state shown in FIG. 10 seen from the left rear side. FIG. 11 is a perspective view of the cargo bed 9 in the expanded state shown in FIG. 11 seen from the left rear side. FIG. 12 is a perspective view of the state that loads 45 are loaded in the cargo bed 9 in the expanded state of FIG. 13 seen from the left rear side. The fourth embodiment has the same configuration as that of the basic form of the pick-up style utility vehicle 1 except for the following configuration. Like members are indicated by like reference numerals.

In the fourth embodiment of the present invention, a buckle 40 for the rear seat 22 attached to the screen shield 10 is used as one component of a seatbelt protection device for the rear seat 22 in 4 passengers transformation (the unexpanded used form) and is used as one component of a holding device for holding the loads 45 loaded in the cargo bed 9 in 2 passengers transformation (the expanded form of the cargo bed).

As shown in FIGS. 10 to 14, the stationary side panel 52 has a hollow portion 52a of the shape and size in which the expandable side panel 55 can be housed therein. The expandable side panel 55 is housed in the hollow portion 52a.

Figure 13:
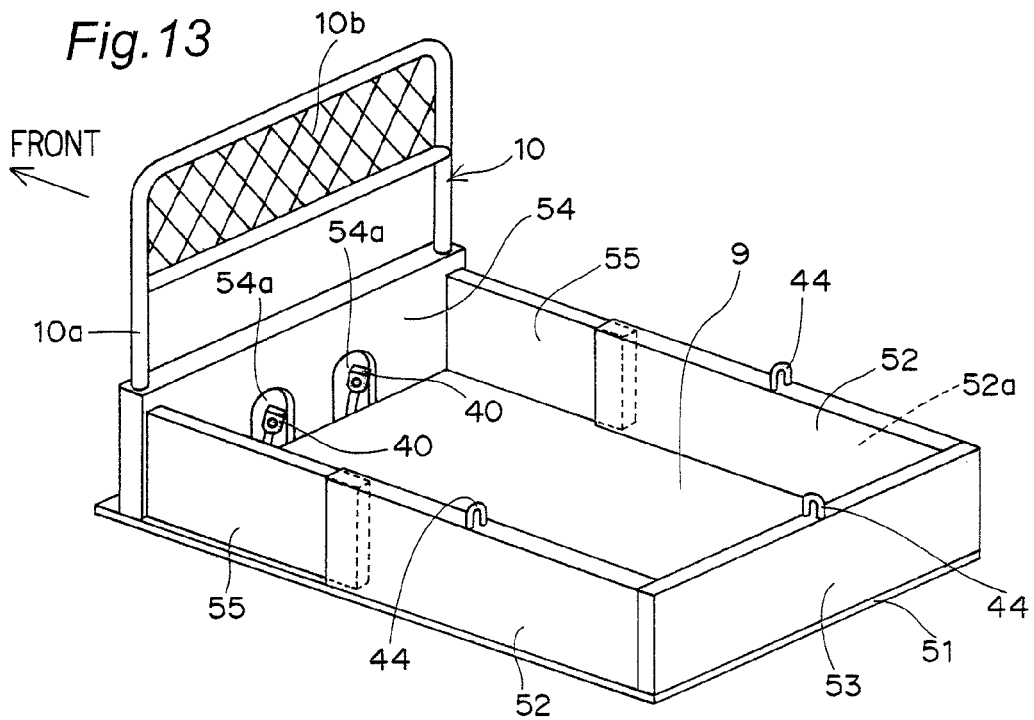
FIG. 13 is a perspective view of the cargo bed in the expanded state of FIG. 11 seen from the left rear side.
Figure 14:
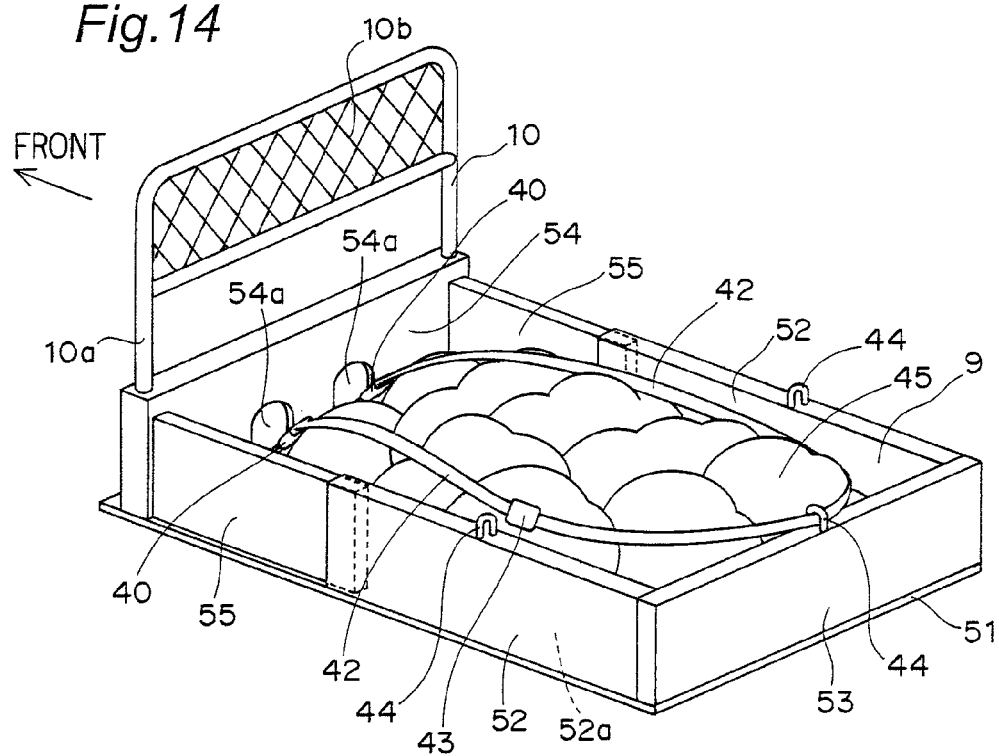
FIG. 14 is a perspective view of the state that loads are loaded in the cargo bed in the expanded state of FIG. 13 seen from the left rear side.

As shown in FIGS. 12 to 14, the front panel 54 of the cargo bed 9 is integrally formed on or fixed to the left and right expandable side panels 55. The frame 10a of the screen shield 10 is fixed to the front panel 54. The front panel 54 and the expandable side panels 55 are integrally slidably movable on the upper surface of the stationary bottom plate 51 forward and rearward.

As described above, the stationary side panel 52 has the hollow portion 52a of the shape and size in which the expandable side panel 55 can be housed therein. When the expandable side panel 55 is located in the unexpanded position shown in FIGS. 10 and 12, the expandable side panel 55 is housed in the hollow portion 52a of the stationary side panel 52. The expandable side panel 55 is housed in the stationary side panel 52 in the unexpanded position. Therefore, the appearance of the cargo bed 9 can be improved and the expandable side panel 55 can be supported by high support rigidity.

The front panel 54 has left and right throughholes 54a communicating the cabin 6 side and the cargo bed 9 side on the center side of the vehicle width. The buckle 40 is attached so as to be rotatable with respect to the lower portion of the front panel 54. The buckle 40 appears on the cabin 6 side in 4 passengers transformation (when each of the side panels 55 is unexpanded) shown in FIGS. 10 and 12 and is used as one component of the seatbelt protection device for the rear seat 22. The buckle 40 appears on the cargo bed 9 side through the throughhole 54a in 2 passengers transformation (when each of the side panels 55 is expanded) shown in FIGS. 11, 13, and 14 and is used as the holding member for holding the loads 45 loaded in the cargo bed 9.

Engaging hooks 44 for inserting a cargo bed belt 42 for holding the loads 45 loaded in the cargo bed 9 are provided on the stationary side panels 52 and the stationary rear panel 53, respectively.

The cargo bed belt 42 includes a tang plate provided at one end of the belt 42 and engaging the buckle 40, a tang plate provided at the other end of the belt 42 and engaging the buckle 40, and a retractor 60 (the device for unwinding and winding the belt 42) provided in the substantially intermediate portion of the belt 42. The length of the belt 42 can be appropriately adjusted by the retractor 60 according to the amount of the loads 45.

In the unexpanded state, the cargo bed belt 42 is unnecessary and is housed below the rear seat 22.

There is no seating on the rear seat 22 in 2 passengers transformation (the expanded form of the cargo bed) shown in FIGS. 11, 13, and 14. Therefore, the buckle 40 for the rear seat 22 is not typically used and the buckle 40 becomes an idling device. According to the fourth embodiment, however, in 2 passengers transformation (the expanded form of the cargo bed), the buckle 40 for the rear seat 22 can be effectively utilized as one component of the holding device for holding the loads 45 loaded in the cargo bed 9.

Fifth Embodiment

Figure 15:
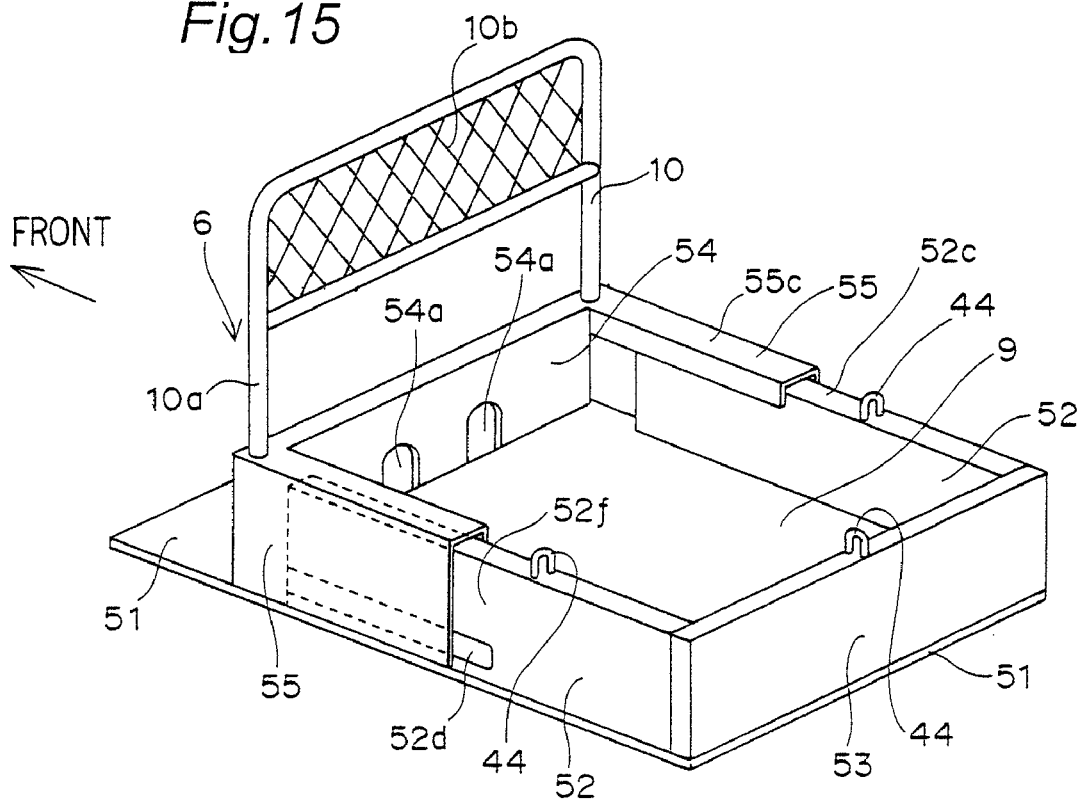
FIG. 15 is a left side view of a cargo bed of a pick-up style utility vehicle according to a fifth embodiment of the present invention in an unexpanded state.

FIG. 15 shows a fifth embodiment of the present invention and is a left side view of a cargo bed 9 of a pick-up style utility vehicle 1 in an unexpanded state. The fifth embodiment has the same configuration as that of the fourth embodiment except for the following configuration. Like members are indicated by like reference numerals.

In the fifth embodiment of the present invention, the buckle 40 for the rear seat 22 attached to the screen shield 10 is used as one component of the seatbelt protection device for the rear seat 22 and one component of the holding device for protecting the loads 45, and the expandable side panel 55 is arranged outward of the stationary side panel 52 in the vehicle width direction and is supported so as to be slidably movable forward and rearward via rollers provided on an upper end face 52c and an outer side face 52f of the stationary side panel 52.

The feature of the fifth embodiment will be described in detail by comparison of the fifth embodiment with the fourth embodiment. An upper panel 55c opposite the upper end face 52c of the stationary side panel 52 from above is integrally formed with the expandable side panel at the upper end of the expandable side panel 55 and the roller abutted on the upper end face 52c of the stationary side panel 52 is rotatably supported. The roller is rotatably supported on the inner side surface of the expandable side panel 55 opposite the outer side surface 52f of the stationary side panel 52. The roller is abutted on a recessed guide portion 52d formed on the outer side surface 52f of the stationary side panel 52.

The front panel 54 has the left and right throughholes 54a communicating the cabin 6 side and the cargo bed 9 side on the center side of the vehicle width. The buckle for the rear seat 22 is attached so as to be rotatable with respect to the lower portion of the front panel 54 fixed to the screen shield 10. The buckle appears on the cabin 6 side in 4 passengers transformation (when each of the side panels 55 is unexpanded) and is used as the seatbelt protection device for the rear seat 22. The buckle appears on the cargo bed 9 side through the throughhole 54a in 2 passengers transformation (when each of the side panels 55 is expanded) and is used as the holding member for holding the loads 45 loaded in the cargo bed 9.

According to the fifth embodiment, in the expanding operation and the unexpanding operation of the cargo bed 9, the buckle for the rear seat 22 is used as one component of the seatbelt protection device for the rear seat 22 and one component of the holding device for holding the loads 45 and can move the screen shield 10, the front panel 54, and the expandable side panel 55 forward and rearward by a light pressing force.

Sixth Embodiment

Figure 16:
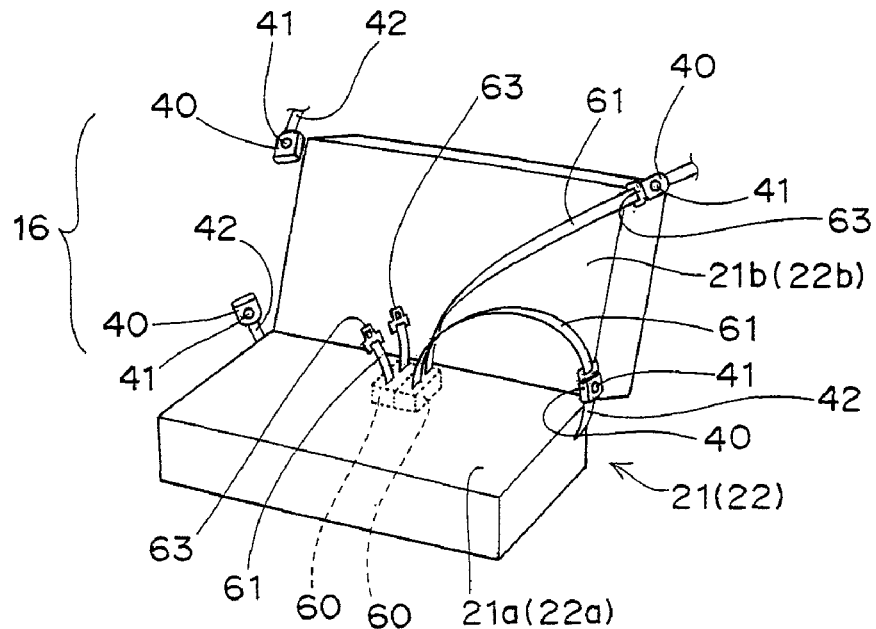
FIG. 16 is a perspective view of a seatbelt protection device of a pick-up style utility vehicle according to a sixth embodiment of the present invention.

FIG. 16 is a perspective view of a seatbelt protection device 16 of a pick-up style utility vehicle 1 according to a sixth embodiment of the present invention. The sixth embodiment has the same configuration as that of the basic form of the pick-up style utility vehicle 1 except for the following configuration. Like members are indicated by like reference numerals.

In the sixth embodiment of the present invention, in the seatbelt protection device 16 provided in the front seat 21 and/or the rear seat 22, the retractor 60 (the device for unwinding and winding a seatbelt 61) is arranged on the center side of the vehicle width of the seat 21 or 22.

In FIG. 16, the seatbelt protection device 16 is a device provided in the front seat 21 and/or the rear seat 22 of the pick-up style utility vehicle 1 and protecting the passenger seated on the front seat 21 and/or the rear seat 22. The front seat 21 and/or the rear seat 22 is a bench seat. The seatbelt protection device 16 includes the seatbelt 61 fastening the passenger, a tang 63 attached to the seatbelt 61, the buckle 40 detachably coupled to the tang 63, and a retractor 60 unwinding and winding the seatbelt 61. The pair of seatbelt protection devices 16 are arranged symmetrically with respect to the center of the vehicle width of the seat 21 or 22.

The buckles 40 are fixed to the upper portion of the side of the cabin frame 7 and the side surface of the front seat 21 and/or the rear seat 22, respectively. A releasing button provided in each of the buckles 40 is pressed in the state that the tang 63 and the buckle 40 are coupled and releases the coupling between the tang 63 and the buckle 40.

The retractor 60 is housed in the lower portion on the center side of the vehicle width of the front seat 21 and/or the rear seat 22. The seatbelt 61 is unwound upward from the retractor 60.

Two seatbelts 61 are housed in one retractor 60. One seatbelt 61 has one end connected to the retractor 60 and the other end coupled to the buckle 40 fixed to the side surface of the seat. The other seatbelt 61 has one end connected to the retractor 60 and the other end coupled to the buckle 40 fixed to the upper portion sideward of the cabin frame 7.

According to the sixth embodiment, the mechanism member as the retractor 60 is housed in the lower portion on the center side of the vehicle width of the front seat 21 and/or the rear seat 22. Therefore, the occurrence of malfunction due to the entry of mud and dust raised by the wheels into the mechanism member as the retractor 60 can be prevented.

Seventh Embodiment

Figure 17:
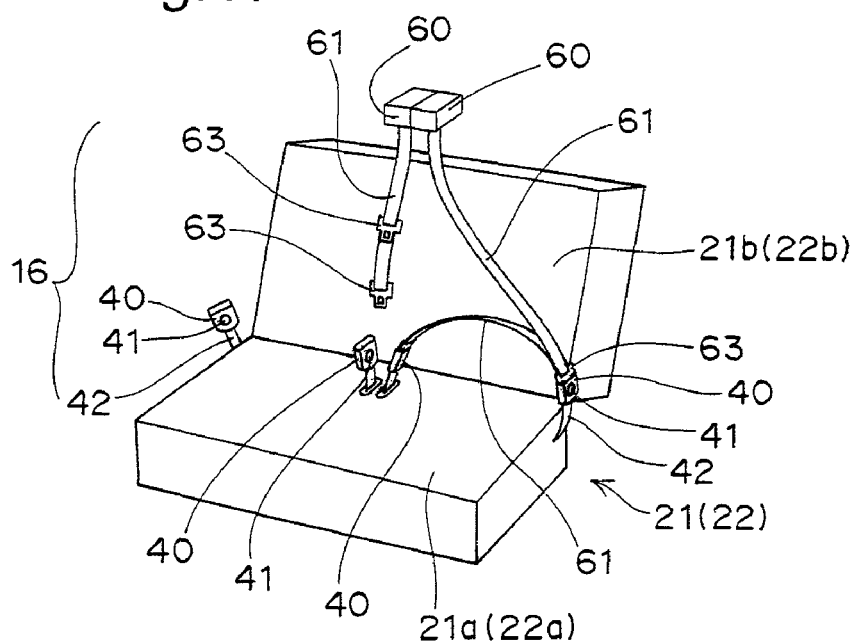
FIG. 17 is a perspective view of a seatbelt protection device of a pick-up style utility vehicle according to a seventh embodiment of the present invention.

FIG. 17 is a perspective view of a seatbelt protection device 16 of a pick-up style utility vehicle 1 according to a seventh embodiment of the present invention. The seventh embodiment has the same configuration as that of the sixth embodiment except for the following configuration. Like members are indicated by like reference numerals.

In the seventh embodiment of the present invention, in the seatbelt protection device 16 provided in the front seat 21 and/or the rear seat 22, the retractor 60 (the device for unwinding and winding the seatbelt 61) is arranged in the upper portion in the center of the cabin frame 7.

In FIG. 17, the buckles 40 are fixed to the side surface and the center portion of the front seat 21 and/or the rear seat 22, respectively. The retractor 60 is fixed to the upper portion in the center of the cabin frame 7. The seatbelt 61 is unwound downward from the retractor 60.

One seatbelt 61 is housed in one retractor 60. The seatbelt 61 has one end connected to the retractor 60 and the other end coupled to the buckles 40 fixed to the side surface and the center portion of the seat 21 or 22. One seatbelt 61 has two tangs. One tang 63 is fixed to the end of the seatbelt 61 and the other tang 63 is movably attached to the intermediate portion of the seatbelt 61.

According to the seventh embodiment, the mechanism member as the retractor 60 is arranged in the upper portion in the center of the cabin frame 7. Therefore, the occurrence of malfunction due to the entry of mud and dust raised by the wheels into the mechanism member as the retractor 60 can be prevented.

Eighth Embodiment

Figure 18:
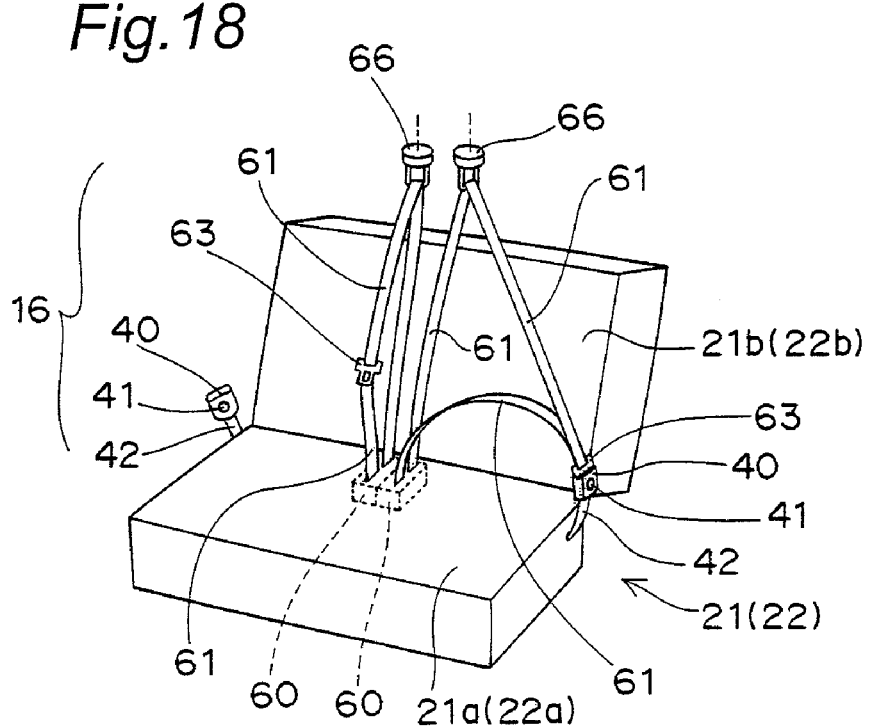
FIG. 18 is a perspective view of a seatbelt protection device of a pick-up style utility vehicle according to an eighth embodiment of the present invention.

FIG. 18 is a perspective view of a seatbelt protection device 16 of a pick-up style utility vehicle 1 according to an eighth embodiment of the present invention. The eighth embodiment has the same configuration as that of the sixth embodiment except for the following configuration. Like members are indicated by like reference numerals.

In the eighth embodiment of the present invention, in the seatbelt protection device 16 provided in the front seat 21 and/or the rear seat 22, the retractor 60 (the device for unwinding and winding the seatbelt 61) is arranged on the center side of the vehicle width of the seat 21 or 22.

In FIG. 18, the buckle 40 is fixed to the side surface of the front seat 21 and/or the rear seat 22. The retractor 60 is housed in the lower portion on the center side of the vehicle width of the front seat 21 and/or the rear seat 22. One seatbelt 61 is housed in one retractor 60. One end and the other end of the seatbelt 61 are connected to the retractor 60 via a suspension member 66 fixed to the upper portion in the center of the cabin frame 7. One seatbelt 61 extends through and suspended by the suspension member 66. The tang 63 is movably attached to between one end and the other end of the seatbelt 61.

According to the eighth embodiment, the mechanism member as the retractor 60 is housed in the lower portion on the center side of the vehicle width of the front seat 21 and/or the rear seat 22. Therefore, the occurrence of malfunction due to the entry of mud and dust raised by the wheels into the mechanism member as the retractor 60 can be prevented.

Ninth Embodiment

Figure 19:
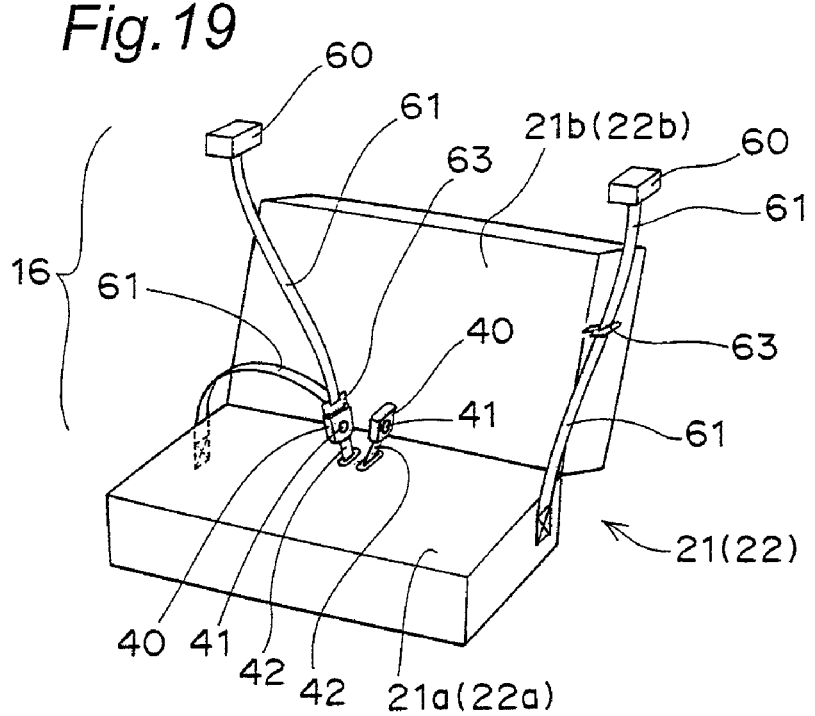
FIG. 19 is a perspective view of the seatbelt protection device of a pick-up style utility vehicle according to a ninth embodiment of the present invention.

FIG. 19 is a perspective view of a seatbelt protection device 16 of a pick-up style utility vehicle 1 according to a ninth embodiment of the present invention. The ninth embodiment has the same configuration as that of the sixth embodiment except for the following configuration. Like members are indicated by like reference numerals.

In the ninth embodiment of the present invention, in the seatbelt protection device 16 provided in the front seat 21 and/or the rear seat 22, the retractor 60 (the device for unwinding and winding the seatbelt 61) is arranged in the upper portion sideward of the cabin frame 7.

In FIG. 19, the buckle 40 is fixed to the center portion of the front seat 21 and/or the rear seat 22. The retractor 60 is fixed to the upper portion sideward of the cabin frame 7. The seatbelt 61 is unwound downward from the retractor 60.

One seatbelt 61 is housed in one retractor 60. The seatbelt 61 has one end connected to the retractor 60 and the other end fixed to the side surface of the seat 21 or 22. One tang 63 is movably attached to between one end and the other end of the seatbelt 61.

According to the ninth embodiment, the mechanism member as the retractor 60 is arranged in the upper portion sideward of the cabin frame 7. Therefore, the occurrence of malfunction due to the entry of mud and dust raised by the wheels into the mechanism member as the retractor 60 can be prevented.

Tenth Embodiment

The pick-up style utility vehicle 1 according to a tenth embodiment of the present invention will be described with reference to FIGS. 20 to 23.

Figure 20:
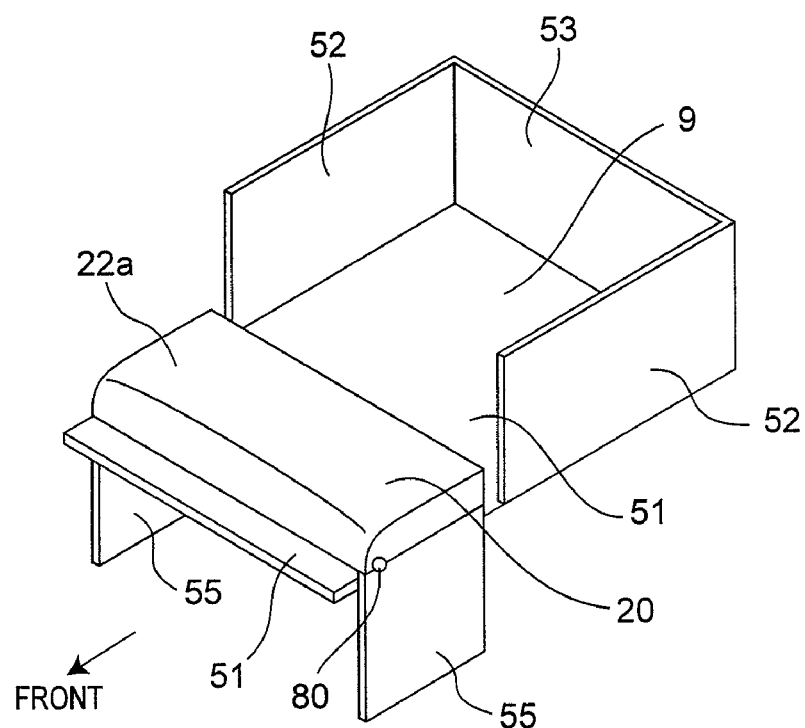
FIG. 20 is a perspective view of a cargo bed of a pick-up style utility vehicle according to a tenth embodiment of the present invention in an unexpanded state seen from the left front side.
Figure 21:
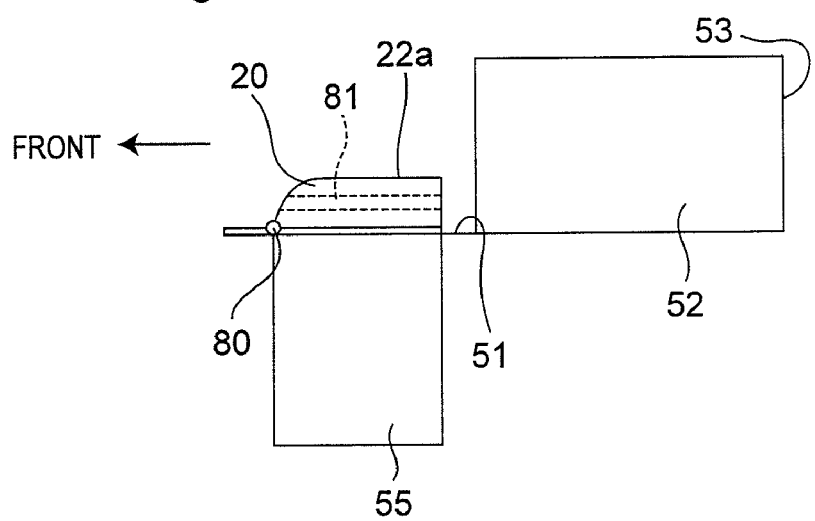
FIG. 21 is a left side view of the cargo bed of the pick-up style utility vehicle of FIG. 20 in the unexpanded state.
Figure 22:
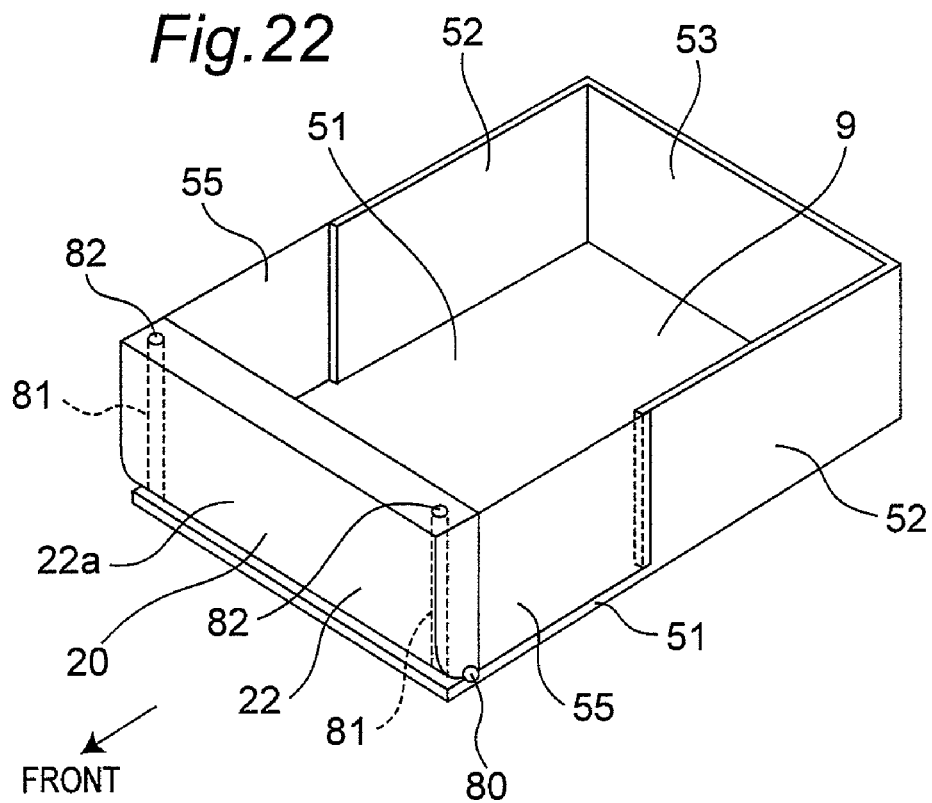
FIG. 22 is a perspective view of the cargo bed of the pick-up style utility vehicle of FIG. 20 in an expanded state seen from the left front side.
Figure 23:
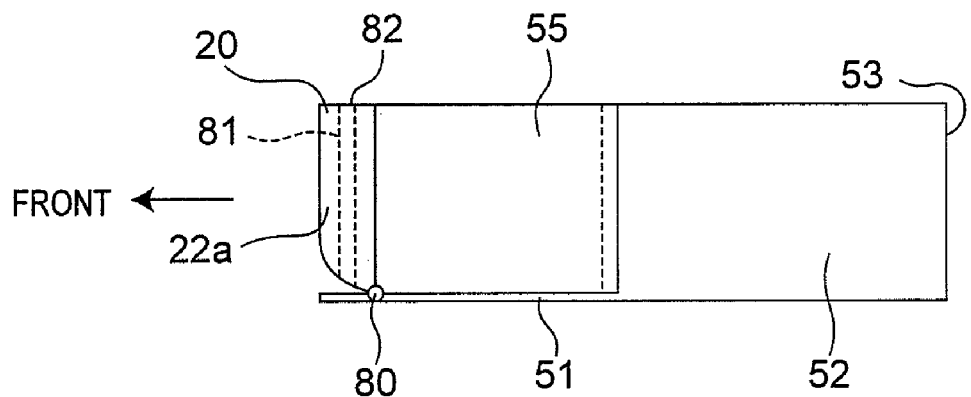
FIG. 23 is a left side view of the cargo bed of the pick-up style utility vehicle of FIG. 20 in the expanded state.

FIG. 20 is a perspective view of a cargo bed 9 of a pick-up style utility vehicle 1 according to the tenth embodiment of the present invention in an unexpanded state seen from the left front side. FIG. 21 is a left side view of the cargo bed 9 shown in FIG. 20 in the unexpanded state. FIG. 22 is a perspective view of the cargo bed 9 shown in FIG. 20 in an expanded state seen from the left front side. FIG. 23 is a left side view of the cargo bed 9 shown in FIG. 22 in the expanded state.

In the tenth embodiment of the present invention, the side plates 55 fixed to both side surfaces of the rotatably supported rear seat 22 are used as the expandable side panels of the cargo bed 9.

As shown in FIGS. 20 and 21, the side plates 55 in a square shape extending downward are fixed to the lower ends of both side surfaces of the seating portion 22a of the rear seat 22, respectively. In the later-described expansion, the side plates 55 extending downward have the size so as to extend rearward, to partially overlap with the stationary side panels 52, and to be located outward of the stationary side panels 52.

The seating portion 22a of the rear seat 22 is rotatably coupled to the stationary bottom plate 51 via hinges 80 provided in front of the stationary bottom plate 51. It is preferred that the front portion of the stationary bottom plate 51 have a small space for supporting the seating portion 22a substantially erected in the later-described expansion. It is also preferred that supporting holes 81 for receiving and supporting the frame 10a of the screen shield 10 be provided near the left and right side ends of the seating portion 22a, respectively.

When the unexpanded form shown in FIGS. 20 and 21 is changed to the expanded form shown in FIGS. 22 and 23, the seating portion 22a is rotated forward about hinges 80 so as to be in the substantially erected state. The left and right side plates 55 fixed to the lower ends of the seating portion 22a are rotated with the rotation of the seating portion 22a. The left and right side plates 55 partially overlap with the stationary side panels 52, are located outward of the stationary side panels 52, and functions as the expandable side panels of the cargo bed 9. The expandable side panels 55 are formed with the operation of rotating the seating portion 22a for changing the unexpanded state to the expanded state. The dropping of the loads loaded in the cargo bed 9 forced out of the gap between the expandable side panels 55 and the stationary side panels 52 can be prevented. Stoppers, not shown, are interposed in the seating portion 22a and/or the side plates 55 to prevent the reverse rotation of the seating portion 22a and the side plates 55.

The frame 10a of the screen shield 10 is inserted into the left and right supporting holes 81 of the seating portion 22a in the substantially erected state so that the screen shield 10 can be brought to the substantially erected state. Housing holes can be provided in the stationary bottom plate 51 in the positions corresponding to the left and right supporting holes 81. The frame 10a of the screen shield 10 is inserted into the supporting holes 81 and the housing holes so that the falling of the seating portion 22a and the screen shield 10 can be prevented. The frame 10a and the housing holes function as stoppers for preventing the falling of the seating portion 22a.

According to the tenth embodiment, in 2 passengers transformation (the expanded form of the cargo bed 9), the expandable side panels 55 are formed in the cargo bed 9 with the forward rotation of the seating portion 22a of the rear seat 22. Therefore, the formation of the expandable side panels 55 becomes very easy and the dropping of the loads from the side of the cargo bed 9 can be prevented.

Eleventh Embodiment

The pick-up style utility vehicle 1 according to an eleventh embodiment of the present invention will be described with reference to FIGS. 24 to 27.

Figure 24:
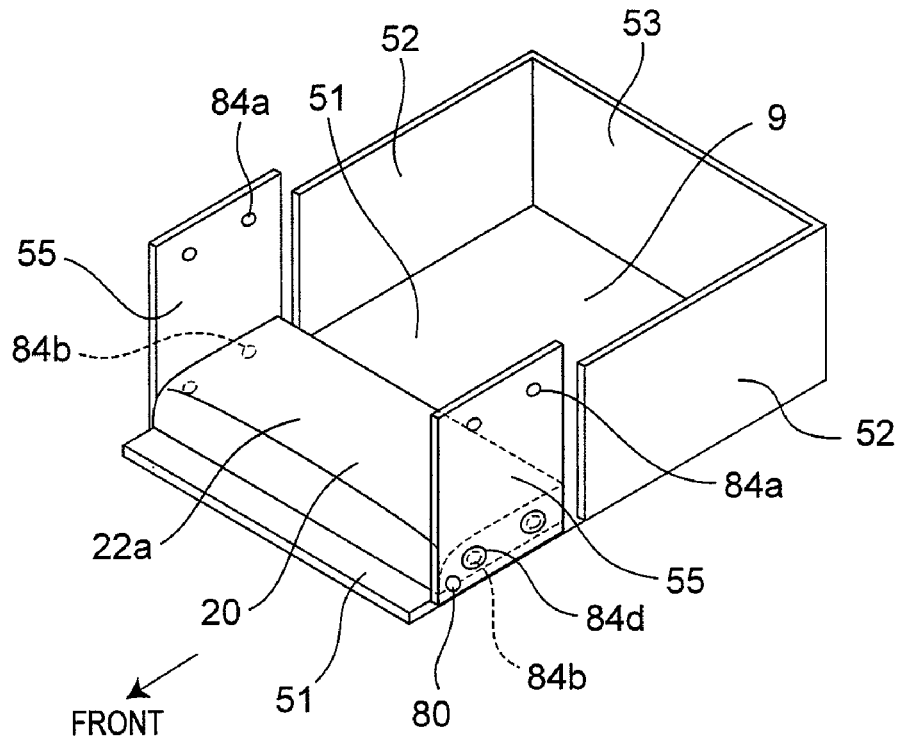
FIG. 24 is a perspective view of a cargo bed of a pick-up style utility vehicle according to an eleventh embodiment of the present invention in an unexpanded state seen from the left front side.
Figure 25:
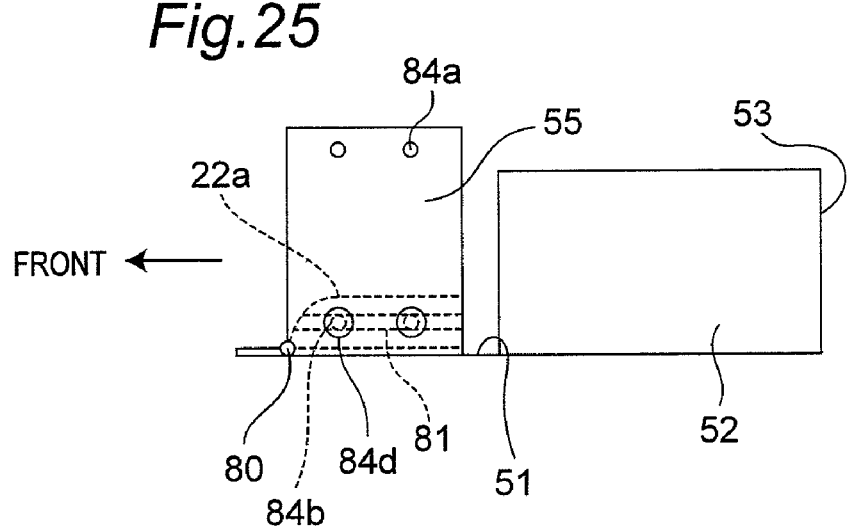
FIG. 25 is a left side view of the cargo bed of the pick-up style utility vehicle of FIG. 24 in the unexpanded state.
Figure 26:
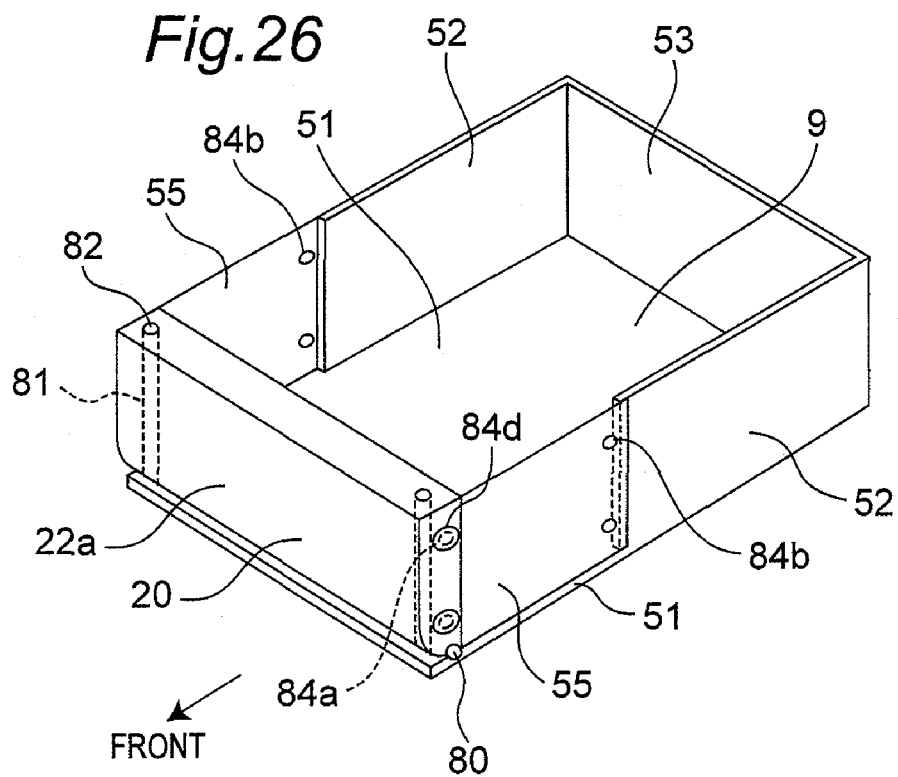
FIG. 26 is a perspective view of the cargo bed of the pick-up style utility vehicle of FIG. 24 in an expanded state seen from the left front side.
Figure 27:
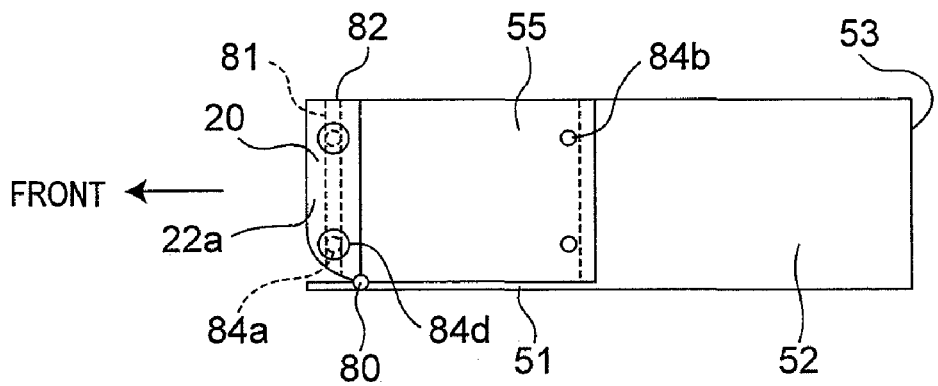
FIG. 27 is a left side view of the cargo bed of the pick-up style utility vehicle of FIG. 24 in the expanded state.

FIG. 24 is a perspective view of the cargo bed 9 of the pick-up style utility vehicle 1 according to the eleventh embodiment of the present invention in the unexpanded state seen from the left front side. FIG. 25 is a left side view of the cargo bed 9 shown in FIG. 24 in the unexpanded state. FIG. 26 is a perspective view of the cargo bed 9 shown in FIG. 24 in the expanded state seen from the left front side. FIG. 27 is a left side view of the cargo bed 9 shown in FIG. 26 in the expanded state. The eleventh embodiment has the same configuration as that of the tenth embodiment except for the following configuration. Like members are indicated by like reference numerals.

In the eleventh embodiment of the present invention, the side plates 55 detachably attached to both side surfaces of the rotatably supported rear seat 22 are used as the expandable side panels of the cargo bed 9.

As shown in FIGS. 24 and 25, the side plates 55 in a square shape extending upward are attached to both side surfaces of the seating portion 22a of the rear seat 22, respectively. In the later-described expansion, the side plates 55 extending upward have the size so as to partially overlap with the stationary side panels 52 and to be located outward of the stationary side panels 52.

Upper attaching holes 84a and lower attaching holes 84b are formed in the left and right side plates 55. The upper attaching holes 84a or the lower attaching holes 84b include two throughholes aligned in the front-rear direction. Two female screws are formed on each of both side surfaces of the seating portion 22a. The two female screws of the seating portion 22a are formed in the positions corresponding to the upper attaching holes 84a or the lower attaching holes 84b.

In the unexpanded state of the cargo bed 9 shown in FIGS. 24 and 25, male screws 84d are screwed into the lower attaching holes 84b of the side plates 55 overlapped with the female screws of the seating portion 22a, respectively, so that the side plates 55 are fixed to the side surfaces of the seating portion 22a. The side plates 55 extend upward with respect to the stationary bottom plate 51. The side plates 55 function as the means to increase retaining force for restraining the movement of the passenger seated on the rear seat 22 with a combination of his seatbelt.

In the expanded state of the cargo bed 9, after the screwing of the male screws 84d is released to detach the side plates 55 from the rear seat 22, the male screws 84d are screwed into the upper attaching holes 84a of the side plates 55 overlapped with the female screws of the seating portion 22a to fix the side plates 55 onto the side surfaces of the seating portion 22a. The side plates 55 extend upward with respect to the stationary bottom plate 51.

When the unexpanded form shown in FIGS. 24 and 25 is changed to the expanded form shown in FIGS. 26 and 27, the seating portion 22a is rotated forward about the hinges 80 so as to be in the substantially erected state. The left and right side plates 55 fixed to the lower end of the seating portion 22a are rotated with the rotation of the seating portion 22a. The left and right side plates 55 partially overlap with the stationary side panels 52, are located outward of the stationary side panels 52, and function as the expandable side panels of the cargo bed 9. The expandable side panels 55 are formed with the operation of rotating the seating portion 22a for changing the unexpanded state to the expanded state. The dropping of the loads loaded in the cargo bed 9 forced out of the gap between the expandable side panels 55 and the stationary side panels 52 can be prevented.

According to the eleventh embodiment, the side plates 55 detachably attached to both side surfaces of the rotatably supported rear seat 22 function as the expandable side panels of the cargo bed 9 and function as the means to increase retaining force for restraining the movement of the passenger seated on the rear seat 22 with a combination of his seatbelt. The attached position of the side plates 55 is changed so that a different function can be easily provided.

Twelfth Embodiment

The pick-up style utility vehicle 1 according to a twelfth embodiment of the present invention will be described with reference to FIGS. 28 to 31.

Figure 28:
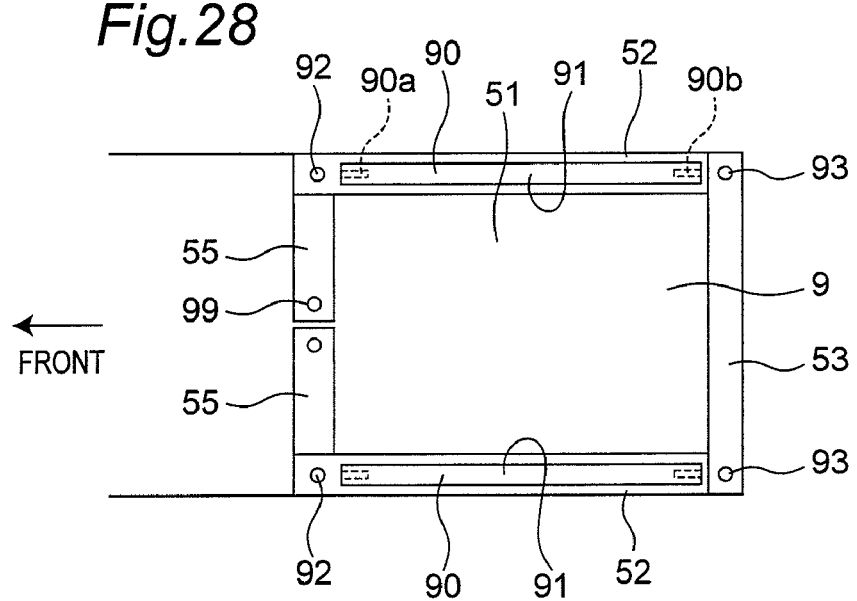
FIG. 28 is a plan view of a cargo bed of a pick-up style utility vehicle according to a twelfth embodiment of the present invention in an unexpanded state.
Figure 29:
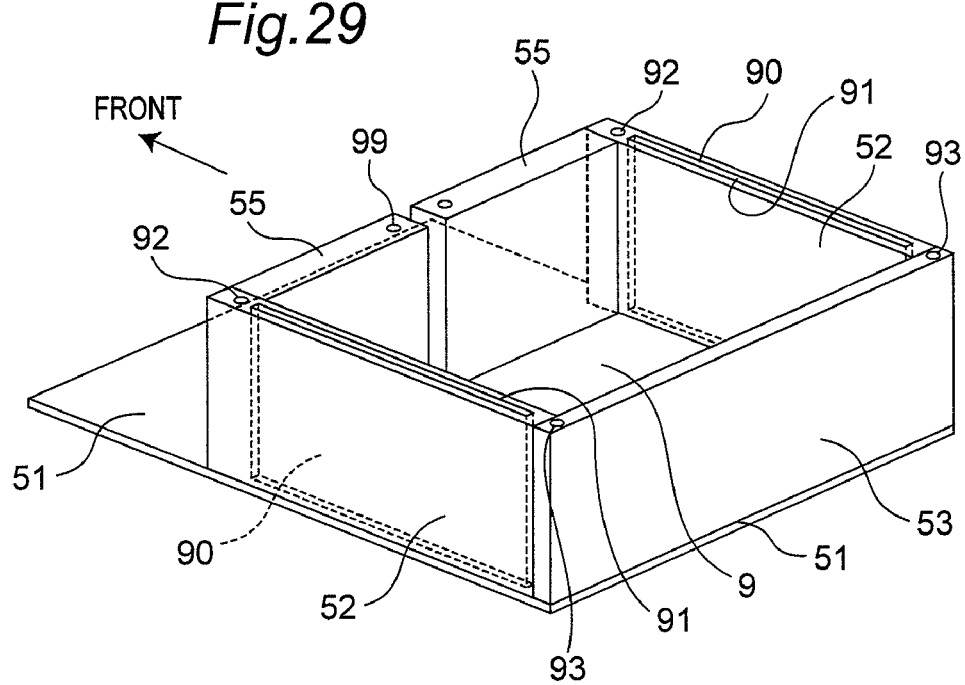
FIG. 29 is a perspective view of the cargo bed of the pick-up style utility vehicle of FIG. 28 in the unexpanded state seen from the left rear side.
Figure 30:
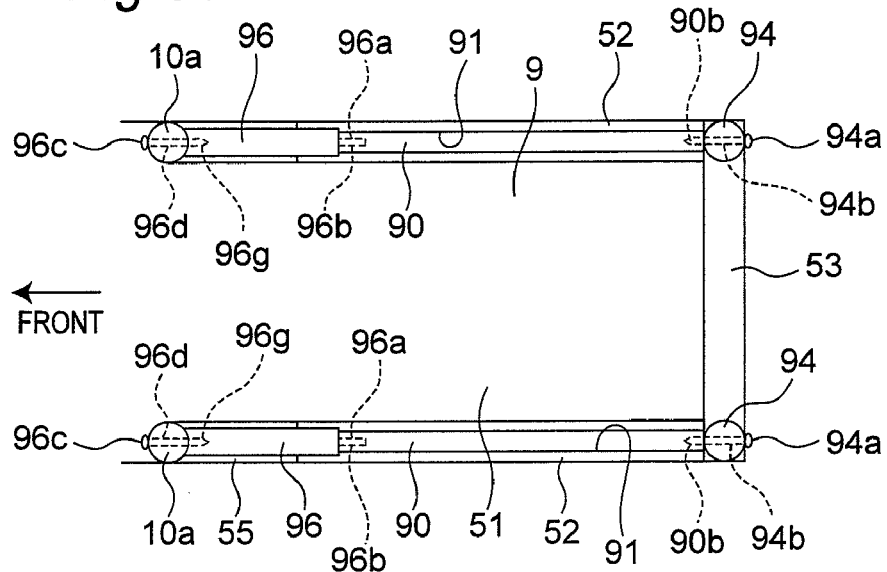
FIG. 30 is a plan view of the cargo bed of the pick-up style utility vehicle of FIG. 28 in an expanded state.

FIG. 28 is a plan view of a cargo bed 9 of a pick-up style utility vehicle 1 according to the twelfth embodiment of the present invention when the cargo bed 9 is in an unexpanded state. FIG. 29 is a perspective view of the cargo bed 9 shown in FIG. 28 in the unexpanded state seen from the left rear side. FIG. 30 is a plan view of the cargo bed 9 shown in FIG. 28 in an expanded state. FIG. 29 is a perspective view of the cargo bed 9 shown in FIG. 28 in the expanded state seen from the left rear side.

In the twelfth embodiment of the present invention, height expandable side panels 90 which can expand the stationary side panels 52 of the cargo bed 9 upward are provided.

In the unexpanded state of the cargo bed 9 shown in FIGS. 28 and 29, the height expandable side panels 90 which are slidably movable upward and downward are housed in housing spaces 91 in the stationary side panels 52. To easily pull up the height expandable side panels 90 as a plate-shaped body in a square shape, it is preferred that holding means such as a knob and a handle be provided on the upper surfaces of the height expandable side panels 90.

Hinges are provided in the forward positions of the left and right stationary side panels 52, respectively. The pair of left and right expandable side panels 55 for expanding the cargo bed 9 forward are rotatably supported by the hinges. In the unexpanded state of the cargo bed 9 shown in FIGS. 28 and 29, the left and right expandable side panels 55 are arranged in the position orthogonal to the front-rear direction.

Female screws 92 for erecting pillars 95 on the stationary side panels 52 are formed at the front ends of the upper surfaces of the left and right stationary side panels 52, respectively. Female screws 93 for erecting pillars 94 on the stationary rear panel 53 are formed at the left and right side ends of the upper surface of the stationary rear panel 53. Female screws 99 for erecting the frame 10a of the screen shield 10 on the expandable side panels 55 are formed at the centrifugal ends of the upper surfaces of the left and right expandable side panels 55, respectively.

Figure 31:
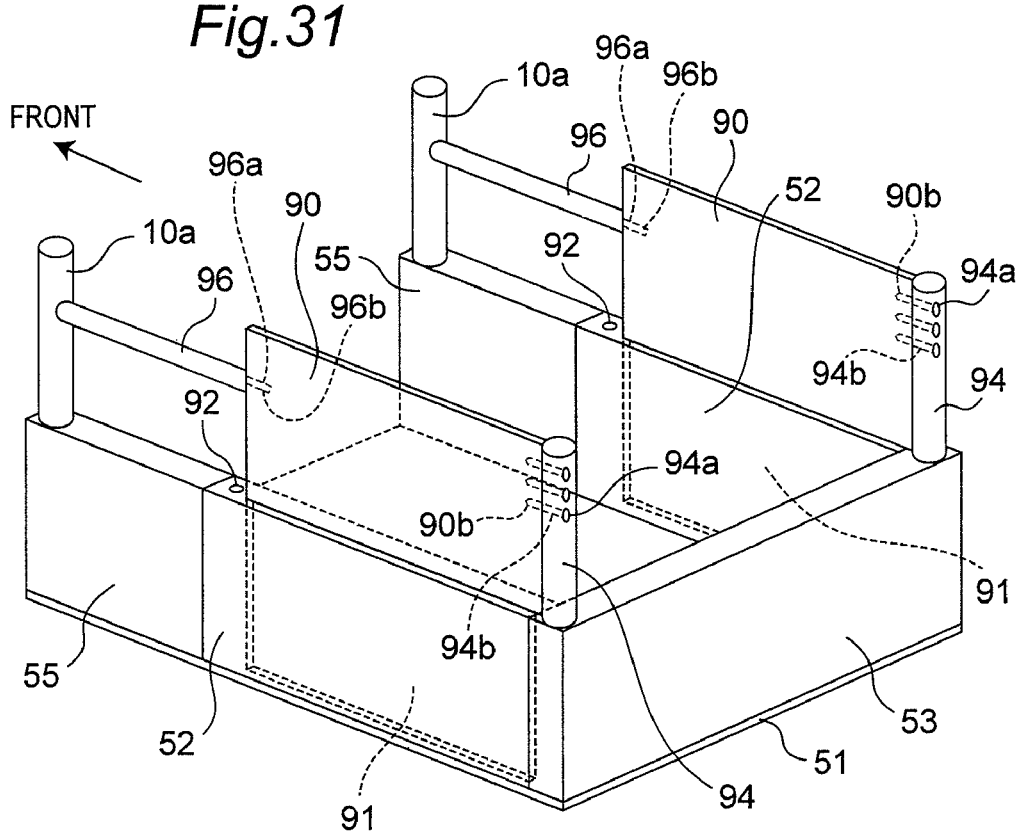
FIG. 31 is a perspective view of the cargo bed of the pick-up style utility vehicle of FIG. 28 in the expanded state seen from the left rear side.

When the unexpanded form shown in FIGS. 28 and 29 is changed to the expanded form shown in FIGS. 30 and 31, after the rear seat 22 is removed from the cargo bed 9, the expandable side panels 55 are rotated forward so that the expandable side panels 55 and the stationary side panels 52 are linearly arrayed. The height expandable side panels 90 housed in the stationary side panels 52 are pulled up.

To position the pulled-up height expandable side panels 90 in a predetermined position, two of the three supporting forms using the female screws 92, 93, and 99 are used.

In the supporting form of the height expandable side panels 90 shown in FIGS. 30 and 31, the female screws 93 and 99 are used. The rear pillars 94 are secured by the female screws 93 and are erected on the stationary rear panel 53. The frame 10a of the screen shield 10 is secured by the female screws 99 and is erected on the expandable side panels 55.

A plurality of throughholes 94b extending forward and rearward are formed in the erected rear pillar 94. A plurality of bottomed holes 90b extending forward and rearward and corresponding to the throughholes 94b of the rear pillar 94 are formed in the rear end face of the expandable side panel 90. In the state that at least one of the throughholes 94b and at least one of the bottomed holes 90b are linearly aligned, a pin 94a is inserted into them. Accordingly, the pulled-up height expandable side panel 90 is supported and positioned by the rear pillar 94.

A plurality of throughholes 96d extending forward and rearward are formed in the frame 10a of the screen shield 10. A plurality of bottomed holes 96b extending forward and rearward and engaging male screw portions 96a of a supporting beam 96 are formed in the front end face of the expandable side panel 90. The rod-like supporting beam 96 is arranged between the rear end face of the frame 10a and the front end face of the expandable side panel 90. The supporting beam 96 has, in its front end face, a plurality of bottomed holes 96g extending forward and rearward and corresponding to the throughholes 96d of the frame 10a, and in its rear end face, the male screw portions 96a.

After the supporting beam 96 is secured to the front end face of the expandable side panel 90, in the state that at least one of the throughholes 96d of the frame 10a and at least one of the bottomed holes 96g of the supporting beam 96 are linearly aligned, a pin 96c is inserted into them. Accordingly, the pulled-up height expandable side panel 90 is supported and positioned by the frame 10a of the screen shield 10 via the rod-like supporting beam 96.

In the unexpanded state, the supporting beams 96 and the rear pillars 94 are unnecessary and are housed below the rear seat 22.

According to the twelfth embodiment, when the amount of loads loaded in the expanded cargo bed 9 is increased and high loads are loaded, the height expandable side panels 90 are pulled up to increase the height of the panel surfaces so that the dropping of the loads can be prevented. In addition, the rod-like supporting beams 96 make the opening region formed between the frame 10a of the screen shield 10 and the height expandable side panels 90 smaller and can contribute to the prevention of the dropping of the loads in the region.

Thirteenth Embodiment

The pick-up style utility vehicle 1 according to a thirteenth embodiment of the present invention will be described with reference to FIGS. 32 and 33.

FIG. 32 is a plan view of a cargo bed 9 of a pick-up style utility vehicle 1 according to the thirteenth embodiment of the present invention in the expanded state. FIG. 33 is a perspective view of the cargo bed 9 shown in FIG. 32 in the expanded state seen from the left rear side.

In the thirteenth embodiment of the present invention, in addition to the height expandable side panels 90 which can expand the stationary side panels 52 of the cargo bed 9 upward, an expandable rear panel 98 detachably erected on the stationary rear panel 53 and expandable front side panels 97 detachably erected on the expandable side panels 55 are provided.

FIGS. 32 and 33 show the state of expanding the cargo bed 9 by removing the rear seat 22 from the cargo bed 9. Therefore, in the expanded state of the cargo bed 9 of FIGS. 32 and 33, the left and right expandable side panels 55 arranged in the position orthogonal to the front-rear direction are rotated forward to linearly align the expandable side panels 55 and the stationary side panels 52. The height expandable side panels 90 as plate-shaped bodies in a square shape housed in the stationary side panels 52 are pulled up.

The female screws 92 for erecting the front pillars 95 on the stationary side panels 52 are formed at the front ends of the upper surfaces of the left and right stationary side panels 52. The female screws 93 for erecting the rear pillars 94 on the stationary rear panel 53 are formed at the left and right side ends of the upper surface of the stationary rear panel 53. The female screws 99 for erecting the frame 10a of the screen shield 10 on the expandable side panels 55 are formed at the centrifugal ends of the upper surfaces of the left and right expandable side panels 55.

In the thirteenth embodiment shown in FIGS. 32 and 33, to position the pulled-up height expandable side panels 90 in a predetermined position, of the three supporting forms using the female screws 92, 93, and 99, the supporting forms using the female screws 92 and 93 are used.

The rear pillars 94 are secured by the female screws 93 and are erected. The front pillars 95 are secured by the female screws 92 and are erected.

The plurality of throughholes 94b extending forward and rearward are formed in the erected rear pillar 94. The plurality of bottomed holes 90b extending forward and rearward and corresponding to the throughholes 94b of the rear pillar 94 are formed in the rear end face of the expandable side panel 90. In the state that at least one of the throughholes 94b and at least one of the bottomed holes 90b are linearly aligned, the pin 94a is inserted into them. Accordingly, the pulled-up height expandable side panel 90 is supported and positioned by the rear pillar 94.

A plurality of throughholes 95b extending forward and rearward are formed in the erected front pillar 95. A plurality of bottomed holes 90a extending forward and rearward and corresponding to the throughholes 95b of the front pillar 95 are formed in the front end face of the expandable side panel 90. In the state that at least one of the throughholes 95b and at least one of the bottomed holes 90a are linearly aligned, a pin 95a is inserted into them. Accordingly, the pulled-up height expandable side panel 90 is supported and positioned by the front pillar 95.

A groove 97a extending upward and downward and having a notched front portion is formed in the front pillar 95. The groove 97a of the front pillar 95 engages a protrusion portion 97b formed at the rear end of the expandable front side panel 97. The rear end of the expandable front side panel 97 engages the front pillar 95 and is supported on the upper surface of the expandable side panel 55.

A groove 98a extending upward and downward and having a notched inside portion is formed in the rear pillar 94. The groove 98a of the rear pillar 94 engages a protrusion portion 98b formed at each of the left and right ends of the expandable rear panel 98. Accordingly, the expandable rear panel 98 is sandwiched between the left and right rear pillars 94 and is supported on the upper surface of the stationary rear panel 53.

The plurality of throughholes 96d extending forward and rearward are formed in the frame 10a of the screen shield 10. The expandable front side panel 97 is arranged between the frame 10a and the front end face of the front pillar 95. The expandable front side panel 97 has, in its front end face, a plurality of the bottomed holes 96g extending forward and rearward and corresponding to the throughholes 96d of the frame 10a. In the state that at least one of the throughholes 96d of the frame 10a and at least one of the bottomed holes 96g of the front pillar 95 are linearly aligned, the pin 96c is inserted into them.

The pins 96c and 94a are inserted in the state of sandwiching the pulled-out height expandable side panel 90 between the front pillar 95 and the rear pillar 94. Accordingly, the height expandable side panel 90 is supported and positioned by the front pillar 95 and the rear pillar 94.

The expandable rear panel 98 is provided between the left and right rear pillars 94 and on the upper surface of the stationary rear panel 53. Each of the left and right expandable front side panels 97 is provided between the rear end face of the frame 10a and the front end face of the front pillar 95 and on the upper surface of each of the left and right expandable side panels 55.

In the unexpanded state, the expandable rear panel 98, the left and right expandable front side panels 97, the rear pillars 94, and the front pillars 95 are unnecessary and are housed below the rear seat 22.

According to the thirteenth embodiment, even when the amount of loads loaded in the expanded cargo bed 9 is increased and high loads are loaded, the height expandable side panels 90 are pulled up to increase the height of the panel surface so that the dropping of the loads can be prevented. In addition, the height of the panel surfaces is increased by the expandable rear panel 98 and the left and right expandable front side panels 97 in a wide range so that the dropping of the loads can further be prevented.

The present invention is not limited to the specific configurations of the above embodiments and includes various modification examples contemplated in the scope without departing from the contents described in the claims.

The invention claimed is:

1. A pick-up style utility vehicle comprising:
   a front seat;
   a rear seat;
   a screen shield; and
   a cargo bed on a vehicle body in this order from front; and
   a cabin frame housing at least the front seat and the rear seat and forming a riding space; wherein:
   the cargo bed is state changeable between an expanded state in which the cargo bed expands forward so as to occupy a portion of the riding space provided by moving the rear seat forward and an unexpanded state not occupying the riding space;
   the cabin frame includes a pair of left and right front side frame bodies, a pair of left and right rear side frame bodies, and cross frame members coupling the front and rear side frame bodies;
   the front side frame bodies are fixed to the vehicle body and the rear side frame bodies and at least one of the cross frame members are changeable with respect to the vehicle body according to the state change of the cargo bed; and
   the change of the rear side frame bodies and at least one of the cross frame members to the expanded state is performed by slidably moving the rear side frame bodies and the at least one cross frame member forward on the vehicle body.

2. A pick-up style utility vehicle comprising:
   a front seat;
   a rear seat;
   a screen shield; and
   a cargo bed on a vehicle body in this order from a front of the vehicle; and
   a cabin frame housing at least the front seat and the rear seat and forming a riding space; wherein:
   the cargo bed is state changeable between an expanded state in which the cargo bed expands forward so as to occupy a portion of the riding space provided by moving the rear seat forward and an unexpanded state not occupying the riding space;
   the cabin frame includes a pair of left and right front side frame bodies, a pair of left and right rear side frame bodies, and cross frame members coupling the front and rear side frame bodies;
   the front side frame bodies are fixed to the vehicle body and the rear side frame bodies and the cross frame members are changeable with respect to the vehicle body according to the state change of the cargo bed; and
   the change of the rear side frame bodies and the cross frame members to the expanded state is performed by pivoting the rear side frame bodies and the cross frame members on the vehicle body and the front side frame bodies, respectively, pivotably mounting the cross frame members so as to be rotatable about a first crossing element and a second crossing element, pivoting the first crossing element and the second crossing element of the cross frame members on the rear side frame bodies, and tiltably moving the rear side frame bodies and the cross frame members forward.

* * * * *